(12) United States Patent
Czymontek

(10) Patent No.: US 8,667,456 B1
(45) Date of Patent: Mar. 4, 2014

(54) CLOUD-BASED INDEXING FOR INTEGRATED DEVELOPMENT ENVIRONMENTS

(75) Inventor: Herbert Karl Czymontek, Mountain View, CA (US)

(73) Assignee: Google Inc., Mountain View, CA (US)

( * ) Notice: Subject to any disclaimer, the term of this patent is extended or adjusted under 35 U.S.C. 154(b) by 482 days.

(21) Appl. No.: 13/091,029

(22) Filed: Apr. 20, 2011

(51) Int. Cl.
*G06F 9/44* (2006.01)

(52) U.S. Cl.
USPC .............................. 717/100; 717/101; 707/696

(58) Field of Classification Search
None
See application file for complete search history.

(56) References Cited

U.S. PATENT DOCUMENTS

| | | | |
|---|---|---|---|
| 6,305,008 B1 | 10/2001 | Vaidyanathan et al. | |
| 6,367,068 B1 | 4/2002 | Vaidyanathan et al. | |
| 6,502,233 B1 | 12/2002 | Vaidyanathan et al. | |
| 7,240,340 B2 | 7/2007 | Vaidyanathan et al. | |
| 8,244,700 B2 * | 8/2012 | Permandla et al. ........... | 707/696 |
| 2004/0010771 A1 * | 1/2004 | Wallace et al. .............. | 717/100 |
| 2005/0097508 A1 | 5/2005 | Jacovi et al. | |
| 2005/0210449 A1 * | 9/2005 | Coley et al. ................... | 717/120 |
| 2006/0101372 A1 * | 5/2006 | Zhuo et al. .................... | 717/100 |
| 2007/0168909 A1 * | 7/2007 | Vaidyanathan et al. ...... | 717/100 |
| 2007/0299825 A1 * | 12/2007 | Rush et al. ........................ | 707/3 |
| 2008/0082490 A1 * | 4/2008 | MacLaurin et al. .............. | 707/3 |
| 2009/0313597 A1 * | 12/2009 | Rathbone et al. ............. | 717/100 |
| 2010/0106705 A1 * | 4/2010 | Rush et al. ..................... | 707/709 |
| 2010/0205160 A1 * | 8/2010 | Kumar et al. ................. | 707/696 |
| 2012/0159434 A1 * | 6/2012 | Dang et al. ..................... | 717/120 |
| 2012/0246610 A1 * | 9/2012 | Asadullah et al. ............ | 717/103 |

OTHER PUBLICATIONS

Bruch et al., "Learning from examples to improve code completion systems," 2009, ESEC/FSE '09 Proceedings of the the 7th joint meeting of the European software engineering conference and the ACM SIGSOFT symposium on the foundations of software engineering, pp. 213-222.*

Han et al., "Code Completion from Abbreviated Input," 2009, ASE '09 Proceedings of the 2009 IEEE/ACM International Conference on Automated Software Engineering, pp. 332-343.*

Robbes et al., "Improving code completion with program history," 2010, Automated Software Engineering Jun. 2010, vol. 17, Issue 2, pp. 181-212.*

* cited by examiner

*Primary Examiner* — Thuy Dao
*Assistant Examiner* — Stephen Berman
(74) *Attorney, Agent, or Firm* — McDonnell Boehnen Hulbert & Berghoff LLP

(57) ABSTRACT

Disclosed are systems, methods, and devices for providing cloud-based indexing services to cloud-based and client-based software development environments. For example, integrated development environment (IDE) services may be provided at a client device via a cloud-based indexing service, and an indexing request related to source code at least partially loaded at the client device transmitted to the cloud-based indexing service with respect to a type of indexing request selected from a code completion request, a usages request, an annotations listing request, and a refactoring request. The cloud-based indexing service may then access one or more indexes maintained at the cloud-based indexing service, and provide responsive index information to the client device, the index information included in the responsive index information being less than all index information from the one or more indexes corresponding to the source code at least partially loaded at the client device. The responsive index information can then be displayed at the client device.

22 Claims, 10 Drawing Sheets

CLOUD-BASED INDEXING FOR INTEGRATED DEVELOPMENT ENVIRONMENTS

BACKGROUND

Unless otherwise indicated herein, the materials described in this section are not prior art to the claims in this application and are not admitted to be prior art by inclusion in this section.

There are many software development tools to help a software developer produce source code. One standard tool is an integrated development environment (IDE), which provides the developer with a source code editing environment and additional supporting software development tools. Typically, the IDE includes file management tools for loading and saving source code, an editor for writing new source code and editing existing source code, tools for compiling source code, tools for tracing the operation of the source code, tools for selecting pre-defined and previously defined programming objects used in the source code, etc. An "on-line" help function may also be provided. The on-line help functionality may be invoked upon occurrence of a predetermined event, such as a developer positioning a cursor over an identifier followed by a clicking of a mouse button, hovering the mouse cursor over an identifier, selecting a menu or icon after highlighting the identifier, or the partial entry of an identifier into the source code via an input device such as a keyboard.

As programs have become more complex, and the size of source code-bases underlying a program have expanded in size, this on-line help function has become an important tool for increasing programming productivity and reducing error rates. Modern computer programs typically consist of many different source code files and use one or more programming libraries. These programming libraries may include source and/or object code stored in system libraries, networking libraries, and utility libraries comprising many different classes and functions (e.g., methods in object-oriented programming languages, such as C++).

In addition, modern object oriented languages have implemented a number of concepts, such as function overloading and inheritance, that further complicate matters. Function overloading occurs when multiple functions within a class hierarchy share the same name or identifier, but have differing numbers of parameters or differing parameter types. Inheritance allows a parent class to predefine one or more functions for use, and possible modification, in a child class. Because of the proliferation of libraries and classes, and the introduction of concepts such as function overloading and inheritance, the number of functions available to a software developer has risen quickly. This makes it difficult if not impossible for a software developer to remember the calling sequence for any one particular function and/or the instantiation requirements for any one particular class, and also makes it very difficult for a developer to efficiently propagate changes to function names, calling sequences, etc. throughout a large code base, among other problems.

In addition to method and class definitions, software modules will typically define a large number of other identifiers. These additional identifiers may include type definitions (typedefs), variables, macros, parameters, declarators, type qualifiers, keywords, packages, interfaces, expressions, namespaces, templates, objects, labels, operators, file paths, attributes, statements, annotations, literal constants, etc., and each identifier itself may have an associated type, declaration, and/or definition. Particularly in large software projects, it is thus often difficult for a developer to remember the name of the identifier and/or the type, declaration, or definition associated with the identifier. In addition, this information may be context dependent, and may vary based on the current scope of the code being reviewed in the IDE and the scope of the desired identifier. Similar to changes in function calling names and sequences, it is difficult for a developer to consistently and efficiently propagate changes to identifiers throughout a large code base.

On-line help functionality is provided, in part, to reduce the burden on the developer in remembering function names, calling sequences, identifiers, and other programming language identifiers, and to improve correctness of the resulting source code. For example, when a developer begins typing a first four letters of a name of a function, the on-line help functionality may access one or more stored indexes and determine what function names start with the first four letters already been typed by the developer. The on-line help functionality may then display one or more matched functions and reference information regarding the matched function(s). For example, the reference information may include comments associated with each function explaining its purpose and behavior, or may include a parameter list setting forth calling parameters required for each function. Once the particular function desired by the developer has been entered, the on-line help functionality may prompt the developer to enter a value for each calling parameter of the selected function and may display associated data types for each calling parameter, to assist the developer in completing the function call. In the event that the matched function is overloaded, the on-line help functionality may prune a list of matching overloaded functions as the developer adds calling parameters that are incompatible with particular overloaded functions. The on-line help functionality may provide other functions as well, such as a refactoring function, which a developer may use to modify the structure of a program without changing its functionality to improve, for example, readability or performance.

SUMMARY

In order to provide such useful on-line help functionality, the IDE must compute one or more indexes of source code files that are part of a project, or referenced by the project, that the developer is developing. As the size of programming projects has increased, the amount of time necessary to create the one or more indexes has similarly increased. In many cases, the developer can not begin or continue programming until the indexing is completed, causing the developer to lose significant project development time.

One reason that the indexing may take a significant amount of time is that, traditionally, the indexing has been separately completed at each individual IDE running at each developer's client computing device (e.g., system, workstation, laptop, desktop, etc.). These general purpose client computing devices may not have sufficient processing capabilities and/or may not be tuned to process the source code files and create indexes in an efficient manner. The delay in indexing could be reduced by offloading the creation of the indexes to one or more dedicated computing clusters tuned to create indexes of source code files in a quick and efficient manner.

Additionally, given increases in source code file re-use across developers working on a same project, and developers using the same source files in different projects, there is a significant opportunity to share created indexes among developers and among projects, substantially reducing duplicative index creation processes performed at each of a plurality of client computing devices.

Still further, while some client-based applications have been re-developed as cloud-based applications in which copies of data and/or executable program logic are stored at remote server devices and/or shared between the remote server devices and client devices, while allowing client devices to download at least some of this data and program logic as needed for execution at the client device, IDEs have remained primarily client-based applications. Some reasons for the lack of cloud-based IDE applications include, for example, the relative lack of customization available for the software development environment compared to client-based IDEs, the inability to provide a single IDE graphical-user-interface (GUI) acceptable to a large number of developers necessary for the creation and maintenance of a large project, and the inability to provide the same level of on-line help functionality as previously available at client-based IDEs.

Disclosed herein are systems, methods, and devices for providing improved on-line help functionality accessible by both cloud-based IDE applications, and traditionally client-based IDEs modified to offload index creation, maintenance, and access to more capable and robust remote indexing servers.

In one embodiment, a method includes providing, via a computing device, a software development environment in which a developer can develop software. The software development environment could be a traditional IDE client modified to access remote (e.g., cloud-based) indexing services, or could be a client software platform (e.g., a web browser) running IDE software instructions retrieved from a remote (e.g., cloud-based) IDE application server and that is configured to access remote (e.g., cloud-based) indexing services from the same remote IDE application server or a separate dedicated indexing services server. Once loaded on the computing device, the software development environment may load (locally or remotely) and/or check out from a local or remote code repository, one or more source code files. In at least one embodiment, only a portion of a source code file may be loaded into the software development environment, with additional portions of the source code file loaded only as necessary (for example, the portions of a given source code file can be loaded as a developer pages down and accesses each new source code file portion of the given source code file).

The software development environment may then provide on-line help functionality with respect to the loaded source code. For example, in response to detecting a request to access index information from one or more indexes corresponding to the loaded source code, the software development environment may cause the computing device to transmit a corresponding indexing request to a remote indexing services server. In one embodiment, the software development environment may transmit the corresponding indexing request without first accessing or checking for the existence of locally available indexes. Subsequently, the software development environment may receive, via the computing device, responsive information from the one or more indexes corresponding to the loaded source code that is less than all information from the one or more indexes corresponding to the loaded source code. Specifically, instead of returning an entire one or more indexes to the software development environment, the remote indexing services server returns only a subset of indexing information that it maintains with respect to the source code. By moving index creation, maintenance, and access functions to the cloud, the client-based software development environment can instead use its more limited computing capabilities to provide other IDE features and functions more quickly and efficiently, and with lower hardware processing requirements. Furthermore, indexes for a particular software development project can be accessed by a developer anywhere that a connection to the remote indexing services server is available, without the developer having to worry about moving and/or re-creating indexes. Additional benefits exist as well. After receiving the responsive information from the one or more indexes, the software development environment may then display the responsive information in the software development environment via an on-line help display function.

The indexing request generated by the software development environment and transmitted, via the computing device, to the remote indexing services server may be, for example, one or more of a code completion request, a usages request, an annotation listing request, and a refactoring request. In the case of the code completion request and the usages request, the responsive information may including portions of the index that match a corresponding identifier included in the request (setting forth, e.g., potential matching identifiers that may complete a partial identifier typed into the software development environment and/or potential matching identifiers that illustrate where identifiers, matching a full identifier provided in the request, are used throughout associated source code).

Associated source code may include the source code loaded in the software development environment when the request was generated, and, for example, libraries, inherited class files, extended class files, imported source code files, or other relationships that link associated source code files with the source code loaded in the software development environment. In the case of the annotation listing request, the responsive information may include a listing of all tagged annotations, including in one example, "to do" statements in associated source code. In the case of the refactoring request, the responsive information may include a preview of what changes will be made to the associated source code responsive to the refactoring request or may include a success/error message indicating whether the refactoring request was completed successfully or not. In the event a preview of changes is provided, the software development environment may prompt a user with a confirmation message, and in response to receiving a confirmation instruction, transmit a subsequent message to the remote indexing services server confirming that the refactoring operation should be executed. After the refactoring is completed, updated source code may be provided to the software development environment for display, either by the remote indexing services server, the IDE application server, or some other mechanism.

From the remote indexing services server's perspective, systems, methods, and devices are disclosed for providing improved cloud-based on-line help functionality for cloud-based IDE applications and for client-based IDE applications modified to access remote indexing services. Additionally, systems, methods, and devices are disclosed for sharing created indexes among client and/or cloud-based IDEs to reduce the amount of duplicative index creation computation required for providing indexing services to a plurality of various IDEs. In one embodiment, a method includes receiving at an indexing services server, from a client computing device, an indexing request to access index information from one or more indexes corresponding to one or more source code files. Responsive to receiving the indexing request, accessing one or more indexes corresponding to one or more source code files at a source code index data store and generating responsive index information corresponding to the indexing request. Once the responsive index information is generated, it is then transmitted to the client computing device. The responsive index information from the one or more indexes corresponding to the portion of source code is less than all information from the one or more indexes corresponding to the one or more source code files.

In addition to indexing services, other types of services could be provided by the remote indexing services server as well. For example, the IDE could generate and transmit code analysis requests to the indexing services server, and in response, obtain a listing of locations in source code, or actual portions of the source code itself, determined to likely contain errors (or containing bad formatting, lack of documentation or commenting, etc.). In another embodiment, hierarchy or inheritance information and/or mappings could be provided. Other possibilities exist as well.

In another embodiment, the method further includes receiving, at an IDE application server, a source code access request from the client computing device. Responsive to receiving the source code access request, the IDE application server accesses a source code repository and retrieves one or more source code files associated with the source code access request and stores the retrieved one or more source code files in temporary storage. Subsequently, at least a portion of the retrieved one or more source code files is transmitted to the client computing device for display. In an embodiment in which the IDE application server and the indexing services server are the same device, the method may further include generating one or more indexes of the one or more source code files (and/or of associated source code files), and storing the generated indexes in a source code index data store. In an embodiment in which the IDE application server and the indexing services server are separate devices, the method may further include transmitting a predictive indexing request from the IDE application server to the indexing services server instructing the indexing service server to generate one or more indexes of the one or more source code files (and/or associated source code files), and to store the generated indexes in a source code index data store. In at least one embodiment, the indexing services server may, prior to generating the one or more indexes, access the source code index data store to determine whether up-to-date indexes already exist for the one or source code files, and only after determining that up-to-date indexes do not exist, generate corresponding one or more indexes of the one or more source code files.

The generated indexes may include one or more of an annotations index, a text index, and a stub index. Furthermore, the indexing request may be one or more of a code completion request, a usages request, an annotation listing request, and a refactoring request. In the case of the code completion request and the usages request, the responsive information generated at the indexing services server may include portions of the index that match a corresponding identifier including the request (setting forth, e.g., potential matching identifiers that may complete a partial identifier typed into the software development environment and/or potential matching identifiers that illustrate where identifiers, matching an identifier provided in the request, are used throughout associated source code). In the case of an annotation listing request, the responsive information generated at the indexing services server may include portions of the index that identify all associated annotations, in one example, including all tagged "to do" statements in associated source code files. In the case of the refactoring request, the responsive information generated at the second computing device may include a preview of what changes will be made to the source code responsive to the refactoring request or may include a success/error message indicating whether the refactoring request was completed successfully or not.

The original indexing request may indicate to the indexing services server whether a preview is desired, or whether the refactoring request should be immediately executed without a preview. In the event a preview of changes is requested, the indexing services server may provide a preview of what changes will be made to the one or more source code files (and/or associated source code files) in response to the refactoring request, and may refrain from implementing those changes until a subsequent confirmation message is received from the client computing device. In any event, after the refactoring is completed, updated source code may be provided to the client computing device by either the indexing services server or the IDE application server, among other mechanisms.

In at least one embodiment, the indexing request itself may include information sufficient to identify each index that the indexing services server must reference to generate the responsive information. The information sufficient to identify the corresponding indexes may include, for example, one or more of file names, file paths, last-modified dates, version numbers, and calculated hash values (such as a cyclic redundancy check (CRC)) identifying the source code loaded in the software development environment and all associated source code files. In one embodiment, the indexing request may only include information sufficient to identify a source code file loaded in the software development environment, and the indexing services server may be configured to obtain associated source code file information itself, or via communications with the IDE application server. Other possibilities exist as well.

DETAILED DESCRIPTION

The following detailed description describes various features and functions of the disclosed systems, devices, and methods with reference to the accompanying figures. However, the illustrative embodiments described herein are not meant to be limiting. It will be readily understood that certain aspects of the disclosed systems, devices, and methods can be arranged and combined in a wide variety of different configurations, all of which are contemplated herein.

1. Distributed Computing Architecture Overview

A distributed computing system may allow two or more distributed or co-located computing devices to coordinate their activities in order to achieve a particular goal or result. This coordination may occur via a network (e.g., a local area network, a wide area network, and/or the Internet) or some other form of communicative coupling. With the rise of cheap computer storage (e.g., random access memory, solid state memory, and hard drives) and always-on, networking computing devices (e.g., personal computers (PCs), laptops, tablet devices, and cell phones), new techniques can be employed to take advantage of distributed computing systems.

In particular, cloud-based computing is a term that can refer to distributed computing architectures in which the data and/or program logic are shared between one or more clients and servers on a substantially real-time basis. Parts of the data and program logic may be pre-stored on the client or may be dynamically delivered, as needed or otherwise, to the client accessing the cloud-based application. Details of the architecture can be transparent to the users of client devices. In one example, cloud-based applications may execute primarily at a local client device, and only access resources at the servers on an as-needed basis (an architecture that may also be referred to as "cloud-aided" or "function-offloading"). In another example, cloud-based applications may execute primarily or entirely in a web browser at the local client device so that the user does not need to download, install, and/or manage client software at the client device. Such a web browser may be a standard web browser that is capable of executing program logic consistent with one or more scripting and/or markup languages such as the JAVASCRIPT® scripting language, the HyperText Markup Language (HTML) version 3, 4, and/or 5, the eXtended Markup Language (XML), and so on. Alternatively or additionally, the web browser could be capable of supporting other scripting languages and/or markup languages.

Given the distributed nature of cloud-based applications, various types of functionality included in these applications, or used to facilitate the design and execution of these applications, may be distributed across multiple software modules and/or hardware platforms. To illustrate such a possible arrangement, FIG. 1 depicts a distributed computing architecture in accordance with an example embodiment.

Figure 1:
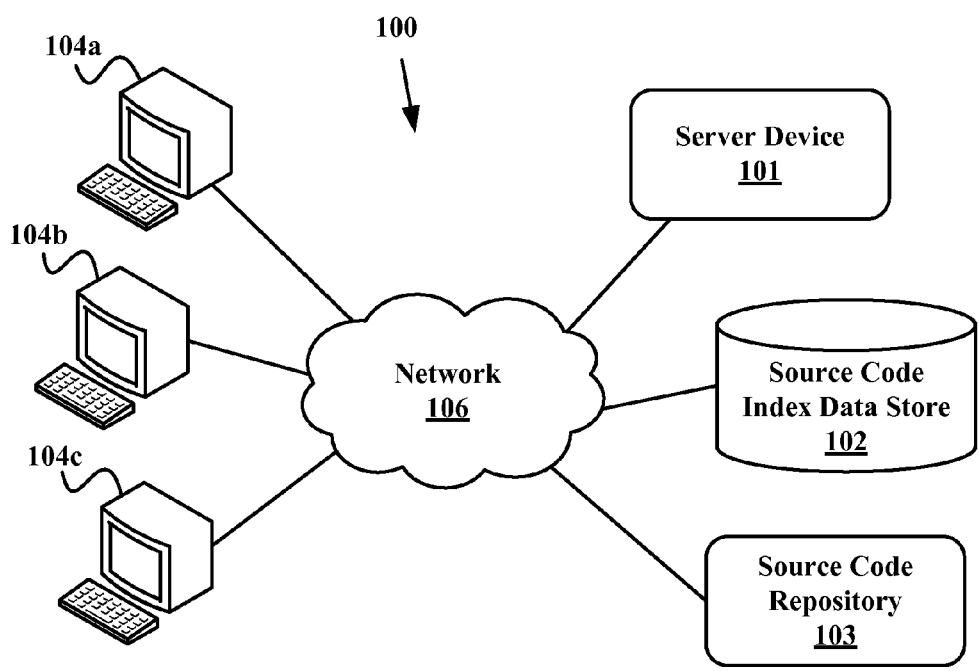
FIG. 1 depicts a distributed computing architecture in accordance with an example embodiment.

In FIG. 1, a server device (e.g., system) 101 is configured to communicate, via a network 106, with client devices 104*a*, 104*b*, and 104*c*. The server device 101 also has access to a source code index data store 102 and a source code repository 103. Server device 101 may communicate with source code index data store 102 and/or source code repository 103 via network 106 (or some other network separate from network 106). In another example, source code index data store 102 and/or source code repository 103 may be co-located with server device 101.

Network 106 may correspond to a LAN, a wide area network (WAN), a corporate intranet, the public Internet, or any other type of network configured to provide a communications path between networked computing devices. The network 106 may also correspond to a combination of one or more LANs, WANs, corporate intranets, and/or the public Internet.

Although FIG. 1 only shows three client devices, distributed application architectures may serve tens, hundreds, or thousands of client devices. Moreover, client devices 104*a*, 104*b*, and 104*c* (or any additional client devices) may be any sort of computing device, such as an ordinary laptop computer, desktop computer, network terminal, wireless communication device (e.g., a cell phone or smart phone), and so on. In some embodiments, client devices 104*a*, 104*b*, and 104*c* may be dedicated to the design and use of software applications. In other embodiments, client devices 104*a*, 104*b*, and 104*c* may be general purpose computers that are configured to perform a number of tasks and need not be dedicated to software development tools.

2. Computing Device Architecture

Figure 2A:
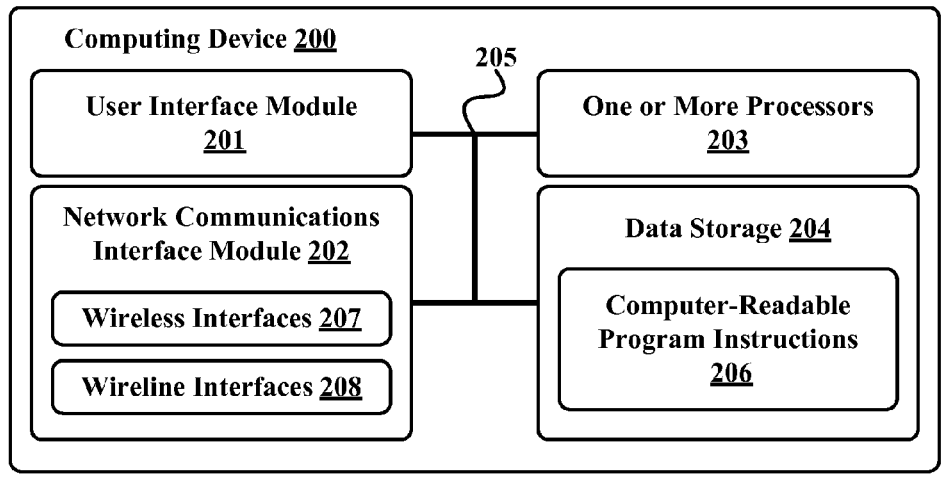
FIG. 2A is a block diagram of a computing device in accordance with an example embodiment.

FIG. 2A is a block diagram of a computing device (e.g., system) in accordance with an example embodiment. In particular, computing device 200 shown in FIG. 2A can be configured to perform one or more functions of server device 101, source code index data store 102, source code repository 103, and/or one or more of client devices 104*a*, 104*b*, and 104*c*. Computing device 200 may include a user interface module 201, a network-communication interface module 202, one or more processors 203, and data storage 204, all of which may be linked together via a system bus, network, or other connection mechanism 205.

The user interface module 201 may be operable to send data to and/or receive data from external user input/output devices. For example, the user interface module 201 may be configured to send and/or receive data to and/or from user input devices such as a keyboard, a keypad, a touch screen, a computer mouse, a track ball, a joystick, a voice recognition module, and/or other similar devices. The user interface module 201 may also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. The user interface module 201 may also be configured to generate audible output(s), such as a speaker, speaker jack, audio output port, audio output device, earphones, and/or other similar devices.

The network-communications interface module 202 may include one or more wireless interfaces 207 and/or one or more wireline interfaces 208 that are configurable to communicate via a network, such as the network 106 shown in FIG. 1. The wireless interfaces 207 may include one or more wireless transmitters, receivers, and/or transceivers, such as a Bluetooth transceiver, a Wi-Fi transceiver, a WiMAX transceiver, and/or other similar type of wireless transceiver configurable to communicate via a wireless network. The wireline interfaces 208 may include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, the network communications interface module 202 may be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms may be used as well or in addition to those listed herein to secure (and then decrypt/decode) communications.

The one or more processors 203 may include one or more general purpose processors and/or one or more special purpose processors (e.g., digital signal processors, application specific integrated circuits, etc.). The one or more processors 203 may be configured to execute computer-readable program instructions 206 that are contained in the data storage 204 and/or other instructions as described herein.

The data storage 204 may include one or more computer-readable storage media that can be read and/or accessed by at least one of the processors 203. The one or more computer-readable storage media may include volatile and/or non-volatile storage components, such as optical, magnetic, organic or other memory or disc storage, which can be integrated in whole or in part with at least one of the processors 203. In some embodiments, the data storage 204 may be implemented using a single physical device (e.g., one optical, magnetic, organic or other memory or disc storage unit), while in other embodiments, the data storage 204 may be implemented using two or more physical devices.

The data storage 204 may include computer-readable program instructions 206 and perhaps additional data. In some embodiments, the data storage 204 may additionally include storage required to perform at least part of the herein-described methods and techniques and/or at least part of the functionality of the herein-described devices and networks.

3. Cloud-Based Servers

Server device (e.g., system) 101, source code index data store 102, and source code repository 103 may be cloud-based devices that store program logic and/or data of cloud-based applications and/or services. In some embodiments, server device 101, source code index data store 102, and source code repository 103 may be a single computing device residing in a single computing center. In other embodiments, server device 101, source code index data store 102, and source code repository 103 may include multiple computing devices in a single computing center, or even multiple computing devices located in multiple computing centers located in diverse geographic locations. For example, FIG. 1 depicts each of server device 101, source code index data store 102, and source code repository 103 residing in different physical locations.

In some embodiments, data and services at server device 101, source code index data store 102, and source code repository 103 may be encoded as computer readable information stored in tangible computer readable media (or computer readable storage media) and accessible by client devices 104a, 104b, and 104c, and/or other computing devices. In some embodiments, source code index data store 102 and/or source code repository 103 may be a single disk drive or other tangible storage media, or may be implemented on multiple disk drives or other tangible storage media located at one or more diverse geographic locations.

Figure 2B:
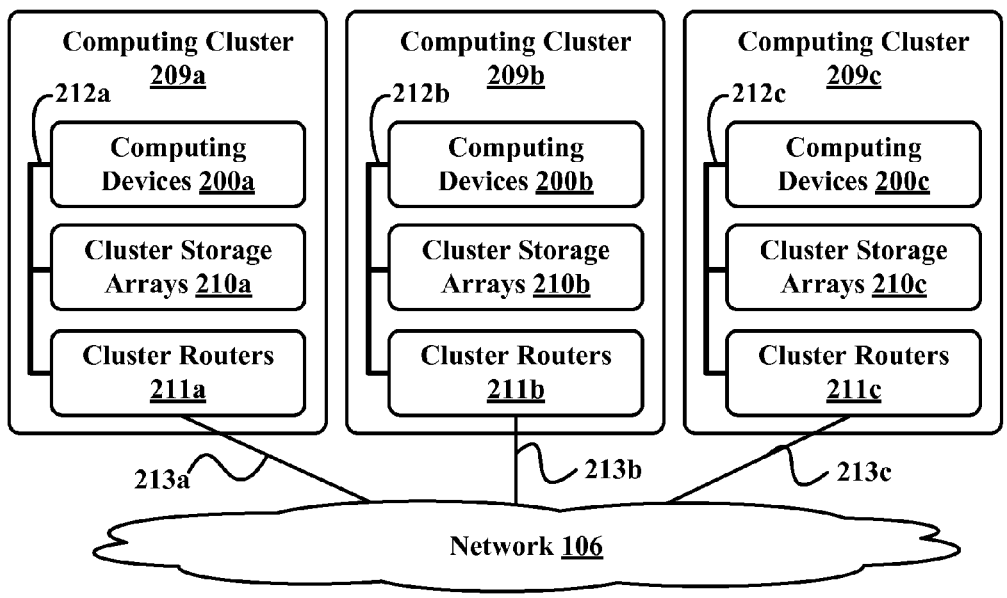
FIG. 2B depicts a cloud-based server system in accordance with an example embodiment.

FIG. 2B depicts a cloud-based server system in accordance with an example embodiment. In FIG. 2B, the functions of server device 101, source code index data store 102, and source code repository 103 may be distributed among three computing clusters 209a, 209b, and 208c. Computing cluster 209a may include one or more computing devices 200a, cluster storage arrays 210a, and cluster routers 211a connected by a local cluster network 212a. Similarly, computing cluster 209b may include one or more computing devices 200b, cluster storage arrays 210b, and cluster routers 211b connected by a local cluster network 212b. Likewise, computing cluster 209c may include one or more computing devices 200c, cluster storage arrays 210c, and cluster routers 211c connected by a local cluster network 212c.

In some embodiments, each of the computing clusters 209a, 209b, and 209c may have an equal number of computing devices, an equal number of cluster storage arrays, and an equal number of cluster routers. In other embodiments, however, each computing cluster may have different numbers of computing devices, different numbers of cluster storage arrays, and different numbers of cluster routers. The number of computing devices, cluster storage arrays, and cluster routers in each computing cluster may depend on the computing task or tasks assigned to each computing cluster.

In computing cluster 209a, for example, computing devices 200a can be configured to perform various computing tasks of server device 101. In one embodiment, the various functionalities of server device 101 can be distributed among one or more of computing devices 200a, 200b, and 200c. Computing devices 200b and 200c in computing clusters 209b and 209c may be configured similarly to computing devices 200a in computing cluster 209a. On the other hand, in some embodiments, computing devices 200a, 200b, and 200c may be configured to perform different functions.

In some embodiments, computing tasks and stored data associated with server device 101, source code index data store 102, and source code repository 103 can be distributed across computing devices 200a, 200b, and 200c based at least in part on the processing requirements of the server device 101, source code index data store 102, and source code repository 103, the processing capabilities of computing devices 200a, 200b, and 200c, the latency of the network links between the computing devices in each computing cluster and between the computing clusters themselves, and/or other factors that may contribute to the cost, speed, fault-tolerance, resiliency, efficiency, and/or other design goals of the overall system architecture.

The cluster storage arrays 210a, 210b, and 210c of the computing clusters 209a, 209b, and 209c may be data storage arrays that include disk array controllers configured to manage read and write access to groups of hard disk drives. The disk array controllers, alone or in conjunction with their respective computing devices, may also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server device 101, source code index data store 102, and source code repository 103 can be distributed across computing devices 200a, 200b, and 200c of computing clusters 209a, 209b, and 209c, various active portions and/or backup portions of these components can be distributed across cluster storage arrays 210a, 210b, and 210c. For example, some cluster storage arrays may be configured to store the data of server device 101, while other cluster storage arrays may store source code index data store 102 and/or source code repository 103. Additionally, some cluster storage arrays may be configured to store backup versions of data stored in other cluster storage arrays.

The cluster routers 211a, 211b, and 211c in computing clusters 209a, 209b, and 209c may include networking equipment configured to provide internal and external communications for the computing clusters. For example, the cluster routers 211a in computing cluster 209a may include one or more internet switching and routing devices configured to provide (i) local area network communications between the computing devices 200a and the cluster storage arrays 201a via the local cluster network 212a, and (ii) wide area network communications between the computing cluster 209a and the computing clusters 209b and 209c via the wide area network connection 213a to network 106. Cluster routers 211b and 211c can include network equipment similar to the cluster routers 211a, and cluster routers 211b and 211c can perform similar networking functions for computing clusters 209b and 209b that cluster routers 211a perform for computing cluster 209a.

In some embodiments, the configuration of the cluster routers 211a, 211b, and 211c can be based at least in part on the data communication requirements of the computing devices and cluster storage arrays, the data communications capabilities of the network equipment in the cluster routers 211a, 211b, and 211c, the latency and throughput of local networks 212a, 212b, 212c, the latency, throughput, and cost of wide area network links 213a, 213b, and 213c, and/or other factors that may contribute to the cost, speed, fault-tolerance, resiliency, efficiency and/or other design goals of the moderation system architecture.

4. Distributed Software Development Architecture

Figure 3:
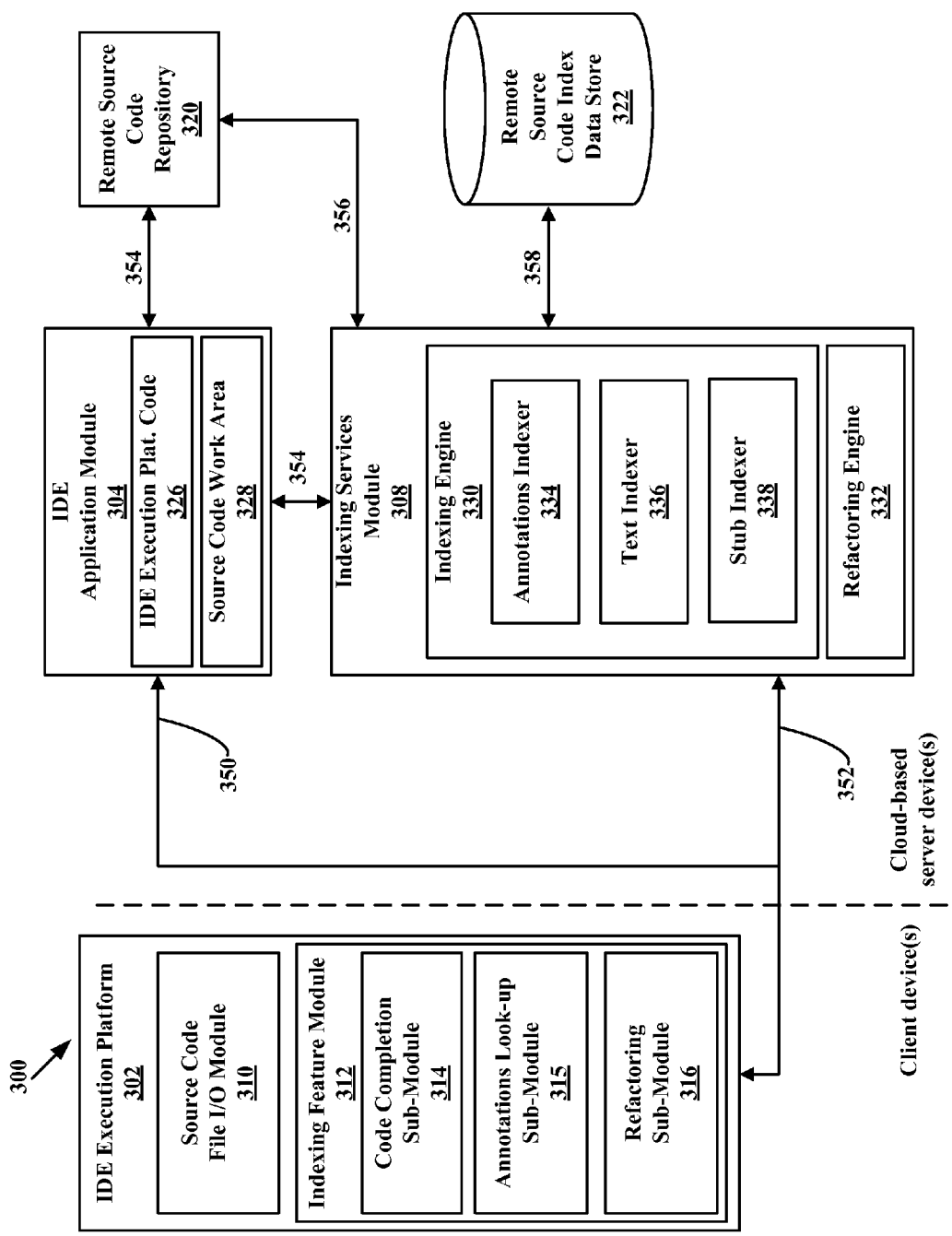
FIG. 3 is a block diagram of a distributed source code indexing services architecture, in accordance with an example embodiment.

FIG. 3 is a block diagram of a distributed software development architecture, in accordance with an example embodiment. In particular, FIG. 3 shows a distributed software development architecture 300 that includes an integrated development environment (IDE) execution platform 302 coupled to a remote IDE application module 304 via a connection 350 and to a remote indexing services module 308 via connection 352. In one example, the IDE execution platform 302 may comprise a number of software modules stored in data storage 204 and executed by one or more processors 203 of a computing device 200, as illustrated in FIG. 2A. The software modules may be stored permanently in data storage 204, or may be retrieved as needed from the IDE application module 304. The IDE application module 304 and indexing services module 308 may comprise a number of respective software modules stored in cluster data storage arrays 210a-210c of computing clusters 209a-209c and executed by one or more computing devices 200a-200c. Of course, other possibilities exist as well.

The software modules comprising IDE execution platform 302 may be configured to provide a number of tools for use by a developer in developing source code. As discussed earlier, such tools may include file management functions (loading and saving source code), editing functions (for writing new source code and editing existing source code, including adding new programming statements comprising one or more identifiers and editing existing programming statement comprising one or more identifiers), compilation functions, linking functions, source code repository functions, and debugging and/or tracing functions, among others. The editing functions provided by IDE execution platform 302 may include an on-line help functionality invoked upon occurrence of a predetermined event, and may provide functions such as source code-completion and refactoring to aid developers in developing new source code and editing existing source code.

As set forth in FIG. 3, IDE execution platform 302 may include a source code file input/output (I/O) module 310 and an indexing feature module 312. The file I/O module 310 may provide local and remote source code file loading and saving operations. For example, file I/O module 310 may access one or more source code files, or portions of source code files, stored in data storage 204. Additionally or alternatively, file I/O module 310 may access one or more source code files or portions of source code files from remote source code repository 320 via connection 350 and IDE application module 304.

Indexing feature module 312 may further include on-line help modules to aid a developer in editing and/or creating source code files. For example, indexing feature module 312 may include a code completion sub-module 314, an annotations look-up sub-module 315, and a refactoring sub-module 316, among other possibilities. Code completion sub-module 314 may be configured to provide a developer with a listing of possible complete identifiers that already exist in the source code being developed (or related source code), based upon factors such as a current context or namespace and a portion of an identifier thus far entered by a developer, and match the portion of the identifier thus far entered by the developer. The listing of matching complete identifiers could be provided to the developer in a number of different ways, such as a pop-up window, a dedicated workspace window-pane, or in-line with the code being developed, among other options. A specific example with respect to code completion is set forth below with respect to FIGS. 4-5.

Annotations look-up sub-module 315 may be configured to provide a developer with a list of previously-tagged sections of source code at which further development is marked as being required in the future. Refactoring sub-module 316 may be configured to allow a developer to rename and/or change the characteristics or structure of already existing code without changing the outward-facing functionality of that code. A number of different refactoring operations are possible, and a specific example of refactoring is set forth below with respect to FIGS. 6-7.

While on-line help modules such as code completion sub-module 314, annotations look-up sub-module 315, and refactoring sub-module 316 may temporarily store a portion of an index relating to source code loaded in IDE execution platform 302, the on-line help modules disclosed herein are not configured to store full indexes locally, but rather, to access indexing services module 308 via connection 352, and to provide on-line help functions to IDE execution platform 302 with the aid of indexing services module 308 and/or IDE application module 304.

Connections 350 and 352, through which IDE execution platform 302 may obtain the services of IDE application module 304 and/or indexing services module 308, may be wired or wireless connections. An example wireless connection may include one or more of a Bluetooth connection, a Wi-Fi connection, a WiMAX connection, and/or other similar type of wireless connections over an open air medium. An example wireline connection may include one or more of an Ethernet connection, a Universal Serial Bus (USB) connection, or similar connection over one or more mediums such as a twisted pair wire, a coaxial cable, a fiber-optic link, or a similar physical medium. Connections 350 and 352 may further contain one or more base stations, routers, switches, LANs, WLANs, WANs, access points, or other network infrastructure. In some embodiments in which the IDE application module 304 is integrated with the indexing services module 308, connections 350 and 352 may be the same connection. Other variations are also possible.

As shown in FIG. 3, one or more cloud-based server devices may provide software modules and storage to further facilitate software development at IDE execution platform 302. Particularly, the cloud-based server devices may include, and/or have access to, the IDE application module 304 and/or the indexing services module 308. The IDE application module 304 may include IDE execution platform code 326 and a temporary source code work area 328, among other possibilities. The IDE execution platform code 326 may include instructions for implementing the IDE execution platform 302 of FIG. 3, and may be configured for downloading by a client computing device, such as computing device 200. For example, the instructions included in IDE execution platform code 326 may be instructions in a scripting language, such as JAVASCRIPT®, PHP, PERL®, JAVA®, AWK, Tcl/Tk, Python, and/or various shell scripting languages.

The temporary source code work area 328 may provide a temporary storage area for source code files checked out from the remote source code repository 320 and being edited by IDE execution platform 302 at a client computing device. Temporary source code work area 328 stores source code associated with one or more projects on which a developer has either worked with in the past or is currently working with, via one or more IDE execution platforms at one or more client computing devices. Source code files may include, for example, C programming language source code files such as .h header files and .c source code files, C++ programming language source code files such as .hh header files and .cc source code files, JAVA programming language source code files such as .java source code files, JavaScript programming language source code files such as .js source code files, and/or .html source code files with respect to markup code based on the HyperText Markup Language (HTML). Many other possibilities exist as well.

Remote source code repository 320 may store one or more projects on which a developer or group of developers have either worked with in the past, are currently working with, or intend to work with in the future. Remote source code repository 320 may act as a clearinghouse of source code files for a particular project, and may provide functions such as version control, checkout and commit processes, merge processes, branching and forking processes, and many other functions traditionally provided by such software control management systems. Source code files managed by the remote source code repository 320 may similarly include, for example, .h header files and .c source code files, .hh header files and .cc source code files, .java source code files, .js source code files, and .html source code files. Many other possibilities exist as well.

IDE execution platforms, such as IDE execution platform 302, may intermittently, periodically, or continuously transmit source code updates to the IDE application module 304 for storage in the temporary source code work area 328. IDE execution platform 302 may cause changes made to source code files stored in the temporary source code work area 328 to be permanently committed to the remote source code repository 320 by transmitting an instruction to do so to IDE application module 304. The IDE application module 304 may be in communication with the remote source code repository 320 via connection 354, which may have a same or similar configuration to that of connection 350, set forth above. In at least one embodiment, remote source code repository 320 may be integrated with the IDE application module 304, in which case connection 354 may be an internal bus within a computing device housing both the IDE application module 304 and the remote source code repository 320.

The indexing services module 308, on the other hand, provides indexing services, such as code-completion services, annotation listing reports, and refactoring services, to client computing devices, and may contain an indexing engine 330 and a refactoring engine 332, among other possibilities. The indexing services module 308 may be coupled to the IDE application module 304 via connection 354, and to the remote source code repository 320 via connection 356. Connections 354 and 356 may take on the same or similar characteristics of connection 350, as set forth above.

In an embodiment in which remote source code repository 320 is incorporated into a same device as the IDE application module 304, only one of connections 354 and 356 may be required. Furthermore, in an embodiment in which indexing services module 308 is also incorporated into a same computing device as IDE application module 304 and/or remote source code repository 320, the connections 354 and 356 may be internal buses within a computing device housing all three of these functions and/or devices. Indexing services module 308 has access to a remote source code index data store 322 via connection 358. Connection 358 may take on the same or similar characteristics of connection 350, as set forth above. In an embodiment in which remote source code index data store 322 is incorporated into a same device as indexing services module 308, connection 358 may become an internal bus within a computing device housing both of these functions and/or devices.

Indexing engine 330 may provide one or more on-line help services to IDE execution platform 302, and in order to do so, may contain one or more different indexers for creating corresponding different types of indexes. For example, indexing engine 330 may contain an annotation indexer 334, a text indexer 336, and a stub indexer 338. Each of these indexers may generate respective indexes from one or more source code files. These indexes may include, for example, a TODO index created by annotations indexer 334, a text index created by text indexer 336, and a stub index created by stub indexer 338. Each of these indexes may be used to provide different on-line help services to IDE execution platforms such as IDE execution platform 302, and may be used in various ways by IDE execution platform 302 in providing on-line help functionality to aid developers in creating new source code and editing existing source code.

For example, the annotations indexer 334 parses source code files that it receives for comment prefixes and a predetermined identifier in order to locate and index "to do" statements, and generate a TODO index. To do statements are tags that are placed in the source code by a developer to indicate a planned future enhancement to the source code. The to do statement is generally placed in a position in the source code near where the planned enhancement is intended to be added. Comment delimiters that may precede a to do statement include, as examples, a double slash "//" and a slash star "/*". In some embodiments, a to do statement can be followed by a comment delimiter as well, such as a star slash "/".

Once a comment is located by a parser in the annotations indexer 334, the parser looks for a predetermined identifier indicating a to do statement, such as the capitalized conjoined words "TODO." Once a to do statement is found within a comment, the annotations indexer 334 records the location of the to do statement (e.g., file name and line number, file path, and other possibilities), and the contents of the to do statement, in a TODO index in remote source code index data store 322. The TODO index may be stored in any one of a number of varying formats, including, for example, plain text, comma separated value (CSV), data interchange format (DIF), extensible markup language (XML), or other file formats. Additionally or alternatively, the TODO index may be stored in a database management system (DBMS) such as MySQL. Individual TODO indexes may be created corresponding to individual source code files, or may be stored in a single TODO index on a project basis, or in a single TODO index for all to do statements stored at remote source code index data store 322. Other possibilities exist as well.

The annotations indexer 334 is an example of a programming language-agnostic indexer that creates an index that is agnostic (i.e. independent) of the programming language in the source code. Rather, the annotations indexer 334 may search for commented identifiers indicating future work to be executed in whatever the underlying programming language of the source code file is and may store the commented identifiers in the TODO index. Other types of annotations could be indexed by annotations indexer 334 as well.

In addition to the annotations indexer 334, text indexer 336 may be implemented by indexing engine 330 to parse source code files for word occurrences and to generate a text index. For example, for a particular source code file, the text indexer 336 may record the words that appear in the source code file, the number of times each appear, and the context in which they appear (e.g., inside a source code statement, inside a comment, inside a source code string, etc.). The text indexer 336 may maintain a mapping between these word occurrences and the filename(s) (perhaps including the file path and/or other identifiers) of source code file(s) in which the words occur. The created text index may be stored in any one of a number of varying formats and/or databases as set forth above with respect to the annotations indexer 334. Individual text indexes may be created corresponding to individual source code files, or text indexes may be stored in a single text index on a project basis, or in a single text index for all text stored at remote source code index data store 322. Other possibilities exist as well.

The text indexer 336 is another example of a programming language-agnostic indexer in that the index it creates is agnostic of the underlying programming language in the source code. Rather, the text indexer 336 searches for word occurrences, records their location and context, and stores the mappings for future use by the indexing services module 308.

In addition to the annotations indexer 334 and the text indexer 336, stub indexer 338 may be implemented by indexing engine 330 to parse source code files that it receives for programming-language specific source code structure and to create a stub index. A stub index is essentially a skeleton of a source code file, and reflects programming-language specific structures and their inter-relationships. For example, in the case of a .java source code file including JAVA language programming instructions, a generated stub file may contain information about import statements, class definitions and their member elements, function names, annotations, interfaces, classes being extended, variables (public and/or private), and other programming language-specific instructions.

The stub indexer 338 is an example of a programming language-specific indexer in that the indexer must have some knowledge of the underlying programming language and its constructs to properly create a stub index reflecting the underlying structure and inter-relationships between programming instructions in the source code file. Examples of the to do index, text index, and stub index are provided below with respect to FIGS. 4 and 5.

Once generated, the respective indexes may be stored in the remote source code index data store 322 of FIG. 3. In addition to storing the generated index(es), indexing engine 330 may create mapping information that associates the generated index with one or more corresponding source code files. The mapping information may allow access to already-created indexes without having to re-index source code files every time an on-line help function is requested from indexing services module 308. Mapping information may include, for example, one or more of file names, file paths, last-modified dates, version numbers, and calculated hash values (such as a CRC) of the corresponding source code files. By being provided with such corresponding mapping information in the future, indexing services module 308 can locate any index information already generated for a particular source code file, and in addition, determine that the index information is up-to-date, perhaps based on a comparison of version number, time comparisons such as a comparison of an edit time of the source code file and a most recent index creation/update time, and/or CRC information.

In addition to indexing engine 330, indexing services module 308 may also contain a refactoring engine 332. Refactoring engine 332 uses one or more of the indexes created by the indexing engine 330 in order to provide refactoring services to IDE execution platforms such as IDE execution platform 302. As set forth earlier, a refactoring process is one that preserves external behavior of the source code being modified, but improves the internal structure of the source code being modified in one or more ways (for performance reasons, readability reasons, etc.).

Three example types of refactoring may be performed on existing source code. A first type of refactoring process operates to change the name and physical organization of source code, including renaming fields, variables, classes, and interfaces, and moving packages and classes. A second type of refactoring process operates to change the logical organization of source code at the class level, including, for example, turning anonymous classes into nested classes, turning nested classes into top-level classes, creating interfaces from concrete classes, and moving methods or fields from a class to a subclass or superclass. A third type of refactoring process operates to change the source code within a class, including turning local variables into class fields, turning selected code in a method into a separate method, and generating getter and setter methods for fields. Other types of refactoring, perhaps that do not fit into any one of these three type, are possible as well.

An example of the first type of refactoring may include changing a variable named "file" of type "inputstream" that previously operated only on input data in a file, to a more aptly named "InputSourceStream" variable when the code is expanded to operate on voice recognized audio input and/or web-page input, among other options. The refactoring process would scour the source code in which the refactoring process is initiated, and any related source code files in the project or elsewhere that may be impacted by the change, and make consistent changes to the source code wherever the "file" reference (with the proper scope) is found (by, e.g., replacing "file" with "InputSourceStream").

An example of the second type of refactoring may include may include changing an anonymous class, which is a type of in-line shorthand that allows a developer to instantiate a class without having to explicitly give it a class name. When the anonymous class becomes large, it may become unwieldy, and also breaks the general rules of encapsulation in object-oriented programming. The refactoring process aids the user by converting a selected anonymous class to a named, nested class.

An example of the third type of refactoring may include may include extracting an in-line method from within one function definition and moving it to a new, separate function definition. The move may be done for purposes of improving the readability of the first code, and/or for purposes of re-using the extracted code in other member functions, or for other reasons. The refactoring process aids the user by converting the selected in-line method into a separate method, and creating a new method call to the new method from the old method in order to maintain the proper function of the old method code.

In order to determine what source code files are impacted by a refactoring process, and what changes are to be made to the source code files, refactoring engine 332 may access one or more indexes of source code files stored at remote source code index data store 322. The indexes may include, for example, text indexes and stub indexes, among other possibilities. Once refactoring engine 332 receives a refactoring request from a client IDE execution platform 302, accesses the source code index data store 322 and/or the remote source code repository 320, and generates responsive information indicating changes to be made to the corresponding source code files responsive to the refactoring request, refactoring engine 332 may provide a preview of the changes to be made to IDE execution platform 302 prior to executing the changes. Only after receiving confirmation from the IDE execution platform 302 to make the proposed changes, may refactoring engine 332 modify the corresponding source code files and commit the changes to remote source code repository 320. In at least one embodiment, refactoring engine 332 may immediately execute the requested refactoring process without first providing a preview of the changes to be made and/or receiving a confirmation instruction from IDE execution platform 302.

In at least one embodiment, indexing services module 308 may be configured to respond to indexing requests from the IDE application module 304. For example, whenever a new or edited source code file is committed to remote source code repository 320, IDE application module 304 may transmit a request (including the new or edited source code files in the request itself, or perhaps sufficient information so that indexing services could separately retrieve the new or edited source code files from remote source code repository 320) instructing indexing services module 308 to create respective indexes for the new or updated files, and to store the indexes in remote source code index data store 322 for future use. The IDE application module 304 may be configured to transmit such a request at a particular time interval (for example, every night beginning at 2:00 AM), and/or may be configured to transmit such a request immediately upon receipt of a new or edited source code file from a client device such as a computing device on which IDE execution platform 302 is executing.

In another embodiment, IDE application module 304 may, in response to receiving a file or project "check-out" or "commit" request from a client device such as a computing device on which IDE execution platform 302 is executing, provide indexing services module 308 with information sufficient to identify the indexes corresponding to the check-out or commit request, which may include, for example, one or more of file names, file paths, last-modified dates, version numbers, and calculated hash values (such as a CRC). Indexing services module 308 may then use that information in order to ensure that indexes stored in remote source code index data store 322 are up to date and readily available to indexing services module 308, so that indexing services module 308 is able to provide indexing services to the IDE execution platform that checked-out the source code files without delay. In the event indexing services module 308 determines that indexes stored in remote source code index data store 322 are not up to date, it may retrieve updated versions of the source code files from the IDE application module 304 or directly from the remote source code repository 320, provide the source code files to the indexing engine 330 for indexing, and store associated indexes in remote source code index data store 322.

In an embodiment, instead of the IDE application module 304 initiating the indexing of new and/or edited source code files, indexing services module 308 may be configured to poll the IDE application module 304 for a list of updated source code files, or may be configured to access remote source code repository 320 directly, and to compare source code file information it has with source code files stored in the repository 320. Source code files stored in the repository that are detected to have an updated version number, file date, or calculated hash value may be retrieved by indexing services module 308 for indexing.

Although not illustrated in FIG. 3, indexing services module 308 may include an indexing queue that holds a list of source code files, and/or the source code files themselves, to be indexed. For example, the indexing queue may act as a first in first out (FIFO) buffer. Other configurations are possible as well.

In order to avoid a build-up of stale indexes, indexing services module 308 may maintain a moving-window of indexes for a plurality of versions of each source code file at remote source code repository 320 that it tracks. For example, the size of the moving window may be five, such that as a new revision of a source code file is detected by indexing services module 308 at remote source code repository 320, the fifth-oldest index (perhaps based on date or version number, among other possibilities) is removed from the remote source code index data store 322. Of course, the size of the moving window could be any number, for example, a number in the range of 1-20.

While one indexing services module 308, one remote source code repository 320, one IDE application module 304, and one remote source code index data store 322 are illustrated in FIG. 3, in at least one embodiment not shown in FIG. 3, more than one indexing services module 308, remote source code repository 320, IDE application module 304, and/or remote source code index data store 322 may be provided.

It should be understood that the components depicted in FIG. 3 may be software, hardware, or some combination of software and hardware. These components may be collocated with one another or distributed across two or more physically distinct computing devices. Further, a distributed development architecture may have more or fewer components, and may arrange these components in a different fashion than shown in FIG. 3.

5. IDE on-Line Help User Interfaces

Figure 4:
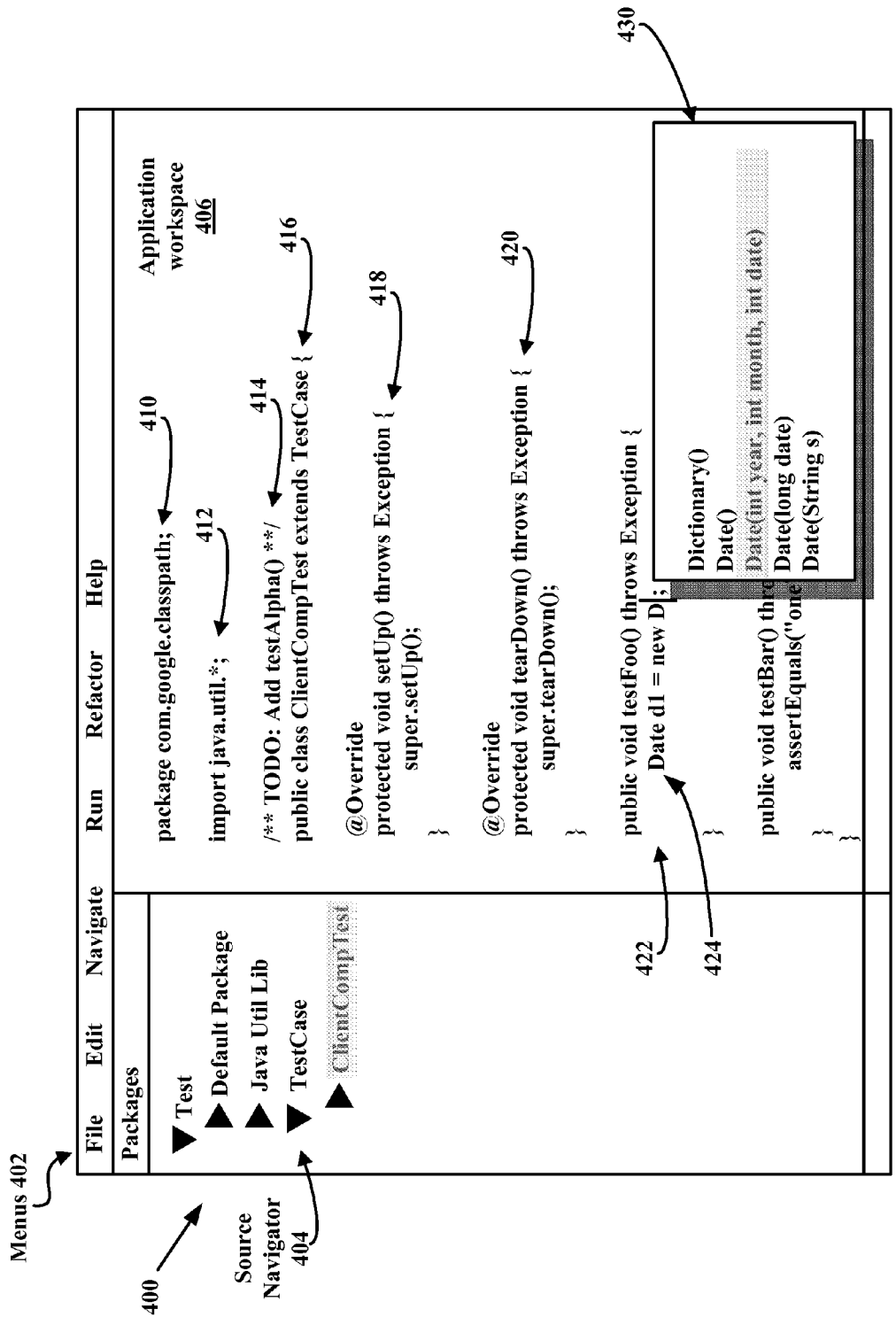
FIG. 4 depicts an integrated development environment (IDE) in accordance with an example embodiment.
Figure 5:
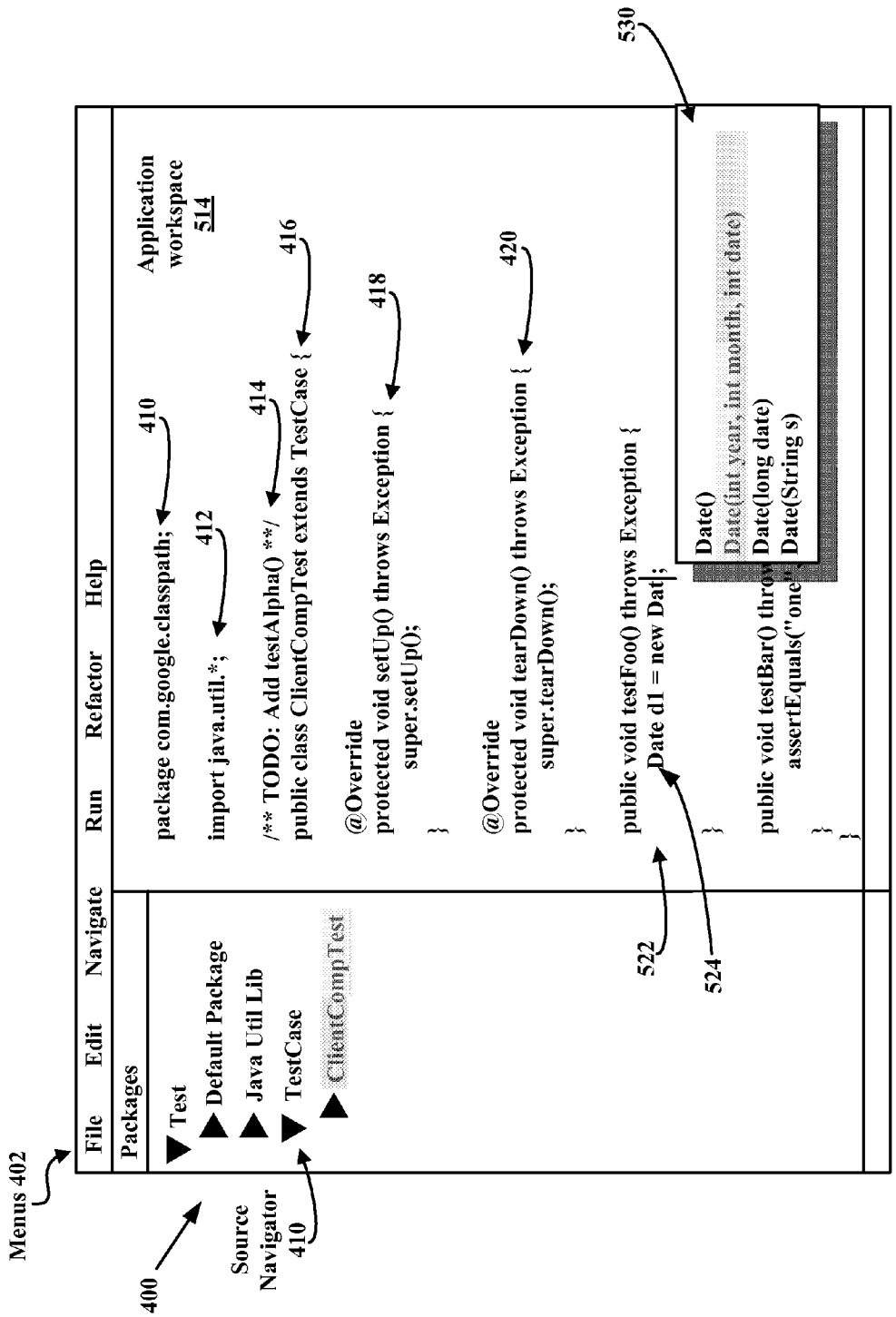
FIG. 5 depicts a further example of the IDE of FIG. 4.
Figure 6:
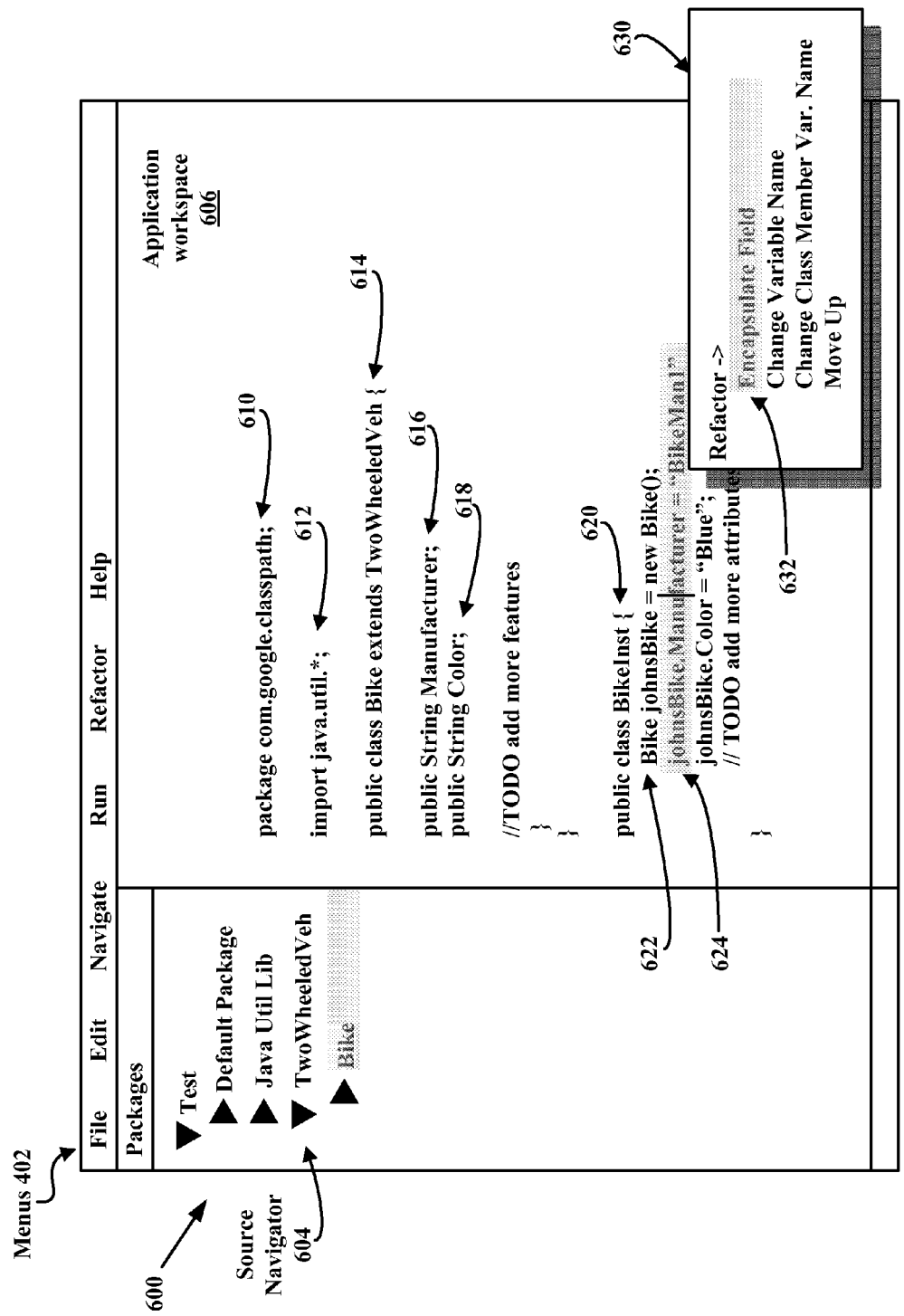
FIG. 6 depicts another IDE in accordance with an example embodiment.
Figure 7:
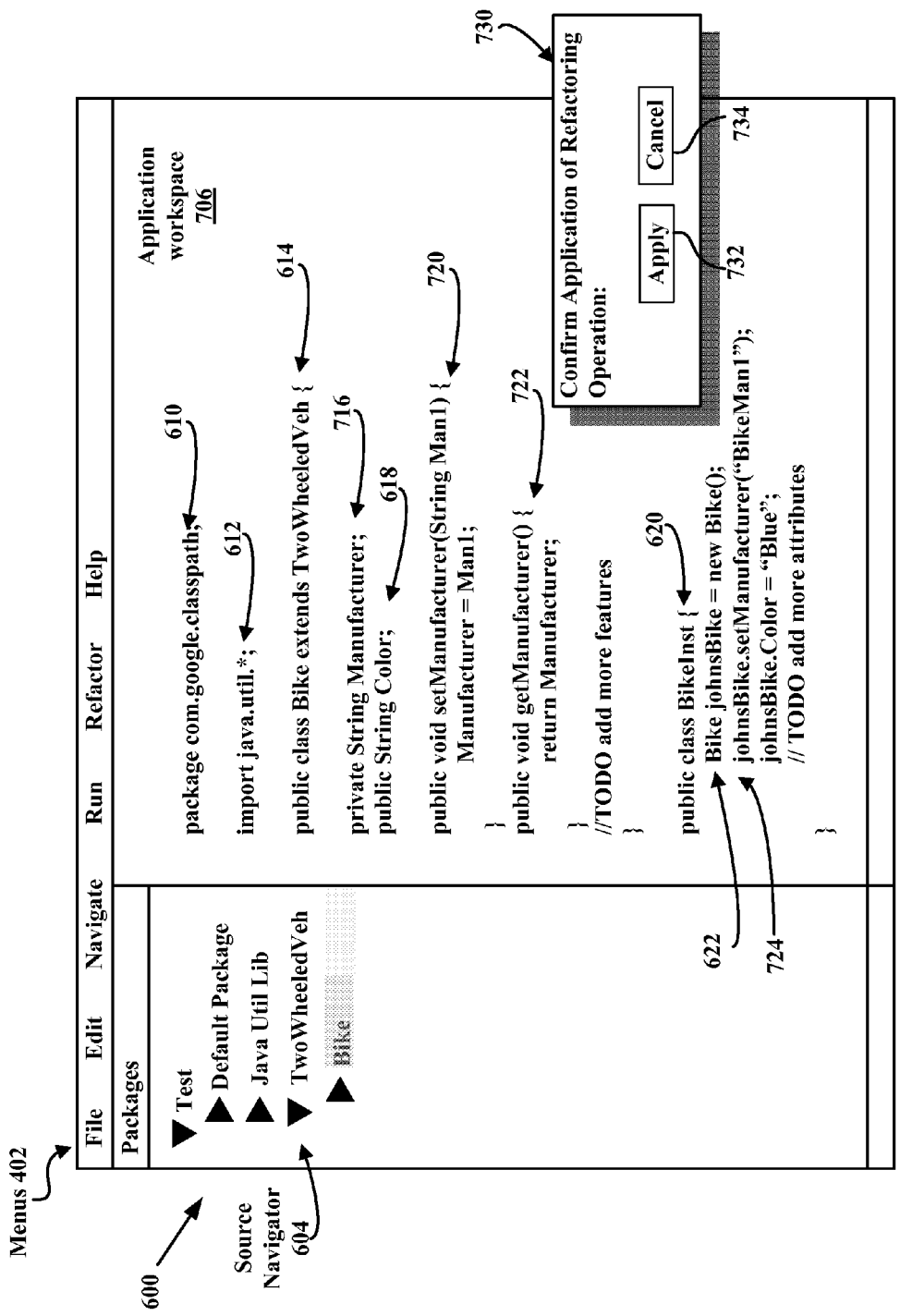
FIG. 7 depicts a further example of the IDE of FIG. 6.

FIGS. 4-7 illustrate examples of user interfaces to IDE execution platform 302, including an on-line help functionality that could benefit from the indexing operations of indexing services module 308. FIGS. 4 and 5 illustrate a code-completion process, and FIGS. 6 and 7 illustrate a refactoring process. Of course, other on-line help functions could be implemented as well.

As set forth in FIG. 4, user interface 400 includes menus 402, source navigator 404, application workspace 406, programming instructions 410-422, partially completed programming instruction 424, and on-line help source code completion pop-up box 430.

Menus 402 include a set of drop-down menus, including a "File" drop-down menu, an "Edit" drop-down menu, a "Source" drop-down menu, a "Navigate" drop-down menu, a "Run" drop-down menu, a "Refactor" drop-down menu, and a "Help" drop-down menu. More or fewer drop-down menus may be included in user interface 400. Also, it should be understood that each of the drop-down menus in menus 402 are shown in their non-dropped-down state. Thus, by hovering a cursor or pointer over a particular drop-down menu, or by selecting a drop-down menu, the respective drop-down menu's items may be displayed.

For example, selecting the "File" drop-down menu may result in options being displayed for creating a new source code file or project, loading an existing source code file or project, saving a currently-loaded source code file or project, committing changes to a currently-loaded source code file or project (e.g., to remote source code repository 320), and/or printing a copy of a currently-loaded source code file or project. In another example, selecting the "Edit" drop-down menu may result in options being displayed for copying, cutting, pasting, or searching programming instructions and/or identifiers displayed in the application workspace 406. In another example, selecting the "Navigate" drop-down menu may result in options being displayed for navigating within a source code file displayed in application workspace 406 and/or between source code files in a currently-loaded project. In a still further example, selecting the "Run" drop-down menu may provide options for compiling and/or debugging the currently-loaded source code file or project. In another example, selecting the "Refactor" drop-down menu may result in options being displayed for applying one or more different refactoring processes on source code displayed in application workspace 406. In yet another example, selecting the "Help" drop-down menu may result in options being displayed for assisting the developer in using the user interface 400.

The source navigator 404 may provide a visual means in which a developer can navigate through source code files in a currently loaded project (e.g., in addition or as an alternative to using the "Navigate" drop-down menu). As illustrated in FIG. 4, the source navigator 404 allows the developer to move between a current class ("ClientCompTest"), a parent class ("TestCase"), and one or more default imported packages ("Default" and "Java Util Lib"). A highlight or other visual augmentation may illustrate the programming element currently being displayed in application workspace 406 (here, for example, the ClientCompTest class).

The application workspace 406 displays all or a portion of the contents of a currently-loaded source code file, which in this case, includes programming instructions 410-422. In particular, the "package com.google.classpath;" programming instruction 410 identifies the package that the displayed file's class or classes belong to. The "import java.util.*" programming instruction 412 imports all classes from the standard java.util package. The programming instruction 414 is a comment including a TODO identifier indicating an intention to add future enhancements (e.g., a "testAlpha( )" function) to the current class. The programming instruction 416 begins the declaration of a public class ClientCompTest that extends a parent class TestCase. The programming instruction 418 defines a member function setUp( ) of the ClientCompTest class that overrides another setUp( ) function (perhaps defined in the parent TestCase class). The programming instruction 420 defines a member function tearDown( ) of the ClientCompTest class that overrides another tearDown( ) function (perhaps defined in the parent TestCase class). The programming instruction 422 defines a member function testFoo( ) that includes a partial statement 424 defining a new variable dl of type Date and assigning a value to the variable dl.

The on-line help source code completion pop-up box (or dialog) 430 displays a number of possible completions for the partial statement 424 in programming instruction 422. The displayed source code completion options in pop-up box 430 are not intended to be complete, and merely show an example of an on-line help functionality that provides source code-completion options to a developer as the developer is typing in a new partial statement.

In order to populate the source code completion options in pop-up box 430, the IDE execution platform 302 may transmit the partial statement 424 to indexing services module 308 along with a request for code completion possibilities to populate the pop-up box 430. The request may also include information sufficient to identify the source code file (or partial source code file, set of source code files, or project) loaded into IDE execution platform 302. The information may include one or more of: file names, file paths, last-modified dates, version numbers, and calculated hash values (such as a CRC) related to the source code file.

After receiving responsive information from the indexing services module 308 relating to the partial statement 424, IDE execution platform 302 may populate the pop-up box 430 with the source code-completion options set forth in FIG. 4. For example, indexing services module 308 may access a stub index associated with the source code file displayed in application workspace 406 and another stub index associated with the imported packages ("java.util.*"), and based on the functions available to the developer at the scope indicated in application workspace 406, transmit responsive information to populate pop-up box 430 including possible source code completion options based, at least partially, on the stub indexes retrieved from remote source code index data store 322 and the partial statement 424 entered by the developer and transmitted to indexing services module 308.

Based on a prediction algorithm executed by indexing services module 308, one of the proposed options in the responsive information may be tagged to indicate a completion option determined by the algorithm to be most probable. IDE execution platform 302 may use the tagged indication to highlight (or otherwise visually augment) one or more of the options displayed in pop-up box 430.

As the developer continues typing in additional characters, or changes an entered character, of the partial statement 424 in programming instruction 422, the IDE execution platform 302 may transmit additional code completion requests to indexing services module 308, and in light of updated responsive information, update the list of completion options in pop-up box 430.

In order to reduce the amount of traffic generated between IDE execution platform 302 and indexing services module 308, and in light of some inherent latency in communications between platform 302 and module 308, indexing services module 308 may predict one or more subsequent characters entered by the developer, or alternate characters to a one or more already-entered characters, generate respective additional responsive information, and provide the additional responsive information to IDE execution platform 302 in addition to the requested responsive information. For example, in the partial statement illustrated in FIG. 4, and perhaps due to the proximity of the "S" button on a keyboard to the "D" button, based on past indexing requests, prediction algorithm(s), and/or other data and/or algorithm(s), indexing services module 308 may provide additional responsive information for matching identifiers that start with the letter "S". This way, if and when the developer operates the backspace key and replaces the last "D" in partial statement 424 with an "S," IDE execution platform 302 already has the necessary and responsive code completion information to populate pop-up box 430, and does not need to generate additional network traffic and incur further delay. While this is additional information from indexes stored at remote source code index data store 322, the additional information may well be less than all the index information stored at remote source code index data store 322 for the source code loaded in IDE execution platform 302 and/or associated with the source code loaded in IDE execution platform 302. Other examples are possible as well.

As set forth in FIG. 5, as the developer continues adding characters to the partial statement 524 (e.g., adding the additional characters "at" to arrive at "Dat"), the list of completion options in pop-up box 530 is updated to remove those options that no longer match the added characters (e.g., "Dictionary( )"), and perhaps is also updated to select a new most probable option (e.g., highlighting the "Date(int year, int month, int date)" completion option). By selecting one of the options listed in pop-up box 530, the IDE execution platform 302 can complete the partial statement 522 without requiring the developer to type all of the parameters into the application workspace 514, and without requiring the developer to manually verify the list of parameters and proper spelling of the "Date" function by accessing the imported java.util.Date class (via the java.util package). Furthermore, because responsive information for the "Date" functions was already provided to the IDE execution platform 302 in a prior transmission, the IDE execution platform 302 should not have to generate additional requests to indexing services module 308 to complete the partial programming statement 524 as the additional characters are provided by the developer.

While FIGS. 4 and 5 set forth one example of an on-line help functionality (e.g., source code completion) that may be provided via IDE execution platform 302 using one or more services provided by indexing services module 308, other types of on-line help functionality could also be provided, such as refactoring. FIGS. 6 and 7 set forth an example of the refactoring process in IDE execution platform 302.

As set forth in FIG. 6, user interface 600 includes menus 402, source navigator 604, application workspace 606, programming instructions 610-624, and on-line help source code refactor pop-up box 630.

Menus 402 provide substantially the same function and feature set as that set forth above with respect to FIG. 4. The source navigator 604, similar to the source navigator 404, may provide a visual means in which a developer can navigate through source code files in a currently loaded project (e.g., in addition or as an alternative to using the "Navigate" drop-down menu). The application workspace 606 displays all or a portion of the contents of a currently-loaded source code file, which in this case, includes programming instructions 610-624. More specifically, the "package com.google.classpath;" programming instruction 610 identifies the package that the displayed file's class or classes belong to. The "import java.util.*" programming instruction 612 imports all classes from the standard java.util package. The programming instruction 614 begins the declaration of a public class Bike that extends a parent class TestCase. The programming instruction 616 defines a member variable Manufacturer, of type String of the Bike class. The programming instruction 618 defines a member variable Color, of type String, of the Bike class. The programming instruction 620 defines a public class BikeInst. The programming instruction 622 creates a new instance of the class Bike (the object johnsBike), and programming instruction 624 assigns a value of "BikeMan1" to the member variable Manufacturer of the johnsBike object.

The on-line help source code completion pop-up box (or dialog) 630 displays a number of possible refactoring operations that could be applied to the highlighted programming instruction 624. The displayed refactoring operations in pop-up box 630 are not intended to be complete, and merely show an example of an on-line help functionality that provides refactoring options to a developer in the context of a particular selected (highlighted) portion of source code.

Based on the selection made by the developer in pop-up box 630, a corresponding refactoring instruction is transmitted to indexing services module 308, which may include the selected refactoring instruction, information sufficient to identify indexes associated with the source code (and/or associated source code) loaded in application workspace 606 (e.g., one or more of file names, file paths, last-modified dates, version numbers, and calculated hash values (such as a CRC) related to the source code), and/or other information. In this case, the developer selects the "Encapsulate Field" refactoring instruction, which will modify the selected member variable Manufacturer to be inaccessible outside of the Bike class (e.g., a private member variable), create Get( ) and Set( ) functions to access the newly private member variable Manufacturer, and modify the selected programming instruction 624 in light of these changes.

Responsive information received at the IDE execution platform 302 from the indexing services module 308 may include a preview of the results of the requested refactoring operation (e.g., the Encapsulate Field operation). As set forth in FIG. 7, the results of the Encapsulate Field refactoring operation include the modification of the Manufacturer member variable at programming instruction 716 to be a private member variable, the addition of two new programming instructions 720 and 722 that provide access to the now private member variable Manufacturer, and the modification of the programming instruction 724 to use the new programming instruction 720 to access the now private member variable Manufacturer.

In addition to providing the developer with a preview of the changes to be made by the refactoring operation, a confirmation window 730 may be provided requesting confirmation regarding whether the changes previewed in application workspace 706 should be applied (via Apply button 732) or canceled (via Cancel button 734). By activating one of buttons 732 and 734, a corresponding instruction can be transmitted to indexing services module 308 to either apply the changes or to cancel application of the changes. If the developer chooses to apply the changes, the instruction transmitted to indexing services module 308 may further instruct the indexing services module 308 to commit the changes to remote source code repository 320 and/or to create new indexes or modify existing indexes in light of the changes. Of course, the changes may also be committed to remote source code repository 320 via source code file I/O module 310 and IDE application module 304, among other possibilities.

In addition to source code completion and refactoring functions, other on-line help functions can be provided that utilize source code indexes stored at remote source code index data store 322, such as providing a list of possible future enhancements based on the TODO index, and providing source code/interface documentation from the text and/or stub indexes. Other possibilities exist as well.

6. Index Creation

Given the source code illustrated in FIGS. 4 and 5, examples of different types of source code indexes created by annotations indexer 334, text indexer 336, and stub indexer 338 can be illustrated for example purposes. For example, an annotations indexer may process the source code illustrated in FIG. 4, locate the comment prefix indicator "/*" in programming statement 414, locate the TODO predetermined identifier indicating a "to do" statement, and create a TODO index (perhaps ClientCompTest.todo) of the ClientCompTest source code file including lines such as:

File: ClientCompTest.java; Version: 5.0; Last Modified: Jan. 1, 2011

"ClientCompTest.java, line 5, TODO: Add testAlpha( )"

. . . .

The ClientCompTest.todo index could then be stored in remote source code index data store 322, as a separate file, or perhaps as a part of a larger index associated with one or more source code files, projects, or all source code files indexed by indexing engine 330.

In another example, a text indexer may process the source code illustrated in FIG. 4, generate a word list for each word located, and generate a text index (perhaps ClientCompTest.text) of the ClientCompTest source code file including lines such as:

File: ClientCompTest.java; Version: 5.0; Last Modified: Jan. 1, 2011
    "protected, 2 occurrences, line 9, line 14"
    "@override, 2 occurrences, line 8, line 13"
    . . . .

Similar to the disclosure above with respect to the annotations indexer 334, the ClientCompTest.text index may be stored in remote source code index data store 322, as a separate file, or perhaps as a part of a larger index associated with one or more source code files, projects, or all source code files indexed by indexing engine 330.

In yet another example, a stub indexer may process the source code illustrated in FIG. 4, generate a skeleton of the programming language specific structures set forth in FIG. 4, and generate a stub index (perhaps ClientCompTest.stub) of the ClientCompTest source code file including lines such as:

```
File: ClientCompTest.stub; Version: 5.0; Last Modified: Jan. 1, 2011
PackageName: com.google.classpath
Children
   -Import List Stub
      -Import Statement: java.util.*
   -Class Stub
      QualifiedName: com.google.classpath.ClientCompTest
      Name: ClientCompTest
      -Children
         ModifierListStub: <empty>
         TypeParameterListStub: <empty>
         RefListStub[Extends List]: TestCase
         RefListStub[Implements List]: <empty>
         FunctionStub[setUp:void]
            ReturnType: void
            Name: setUp
            Children
               ModifierListStub
                  AnnotationStub: @Override
               TypeParameterList: <empty>
               ParameterListStub: <empty>
               RefListStub[Throws List]: Exception
...
```

The ClientCompTest.stub index may contain additional and/or different structural representations to aid indexing services module 308 in quickly locating relevant information for providing on-line help functionality. For example, the ClientCompTest.stub may include a stub tree node organization that couples the various programming constructs together in their own separate blocks (e.g., variables, functions, annotations, etc.). Other possibilities exist as well. Similar to the disclosure above with respect to the annotations indexer 334, the ClientCompTest.stub index may be stored in remote source code index data store 322 as a separate file, or perhaps as a part of a larger index associated with one or more source code files, projects, or all source code files indexed by indexing engine 330.

7. Client-Server Message Flows

Figure 8:
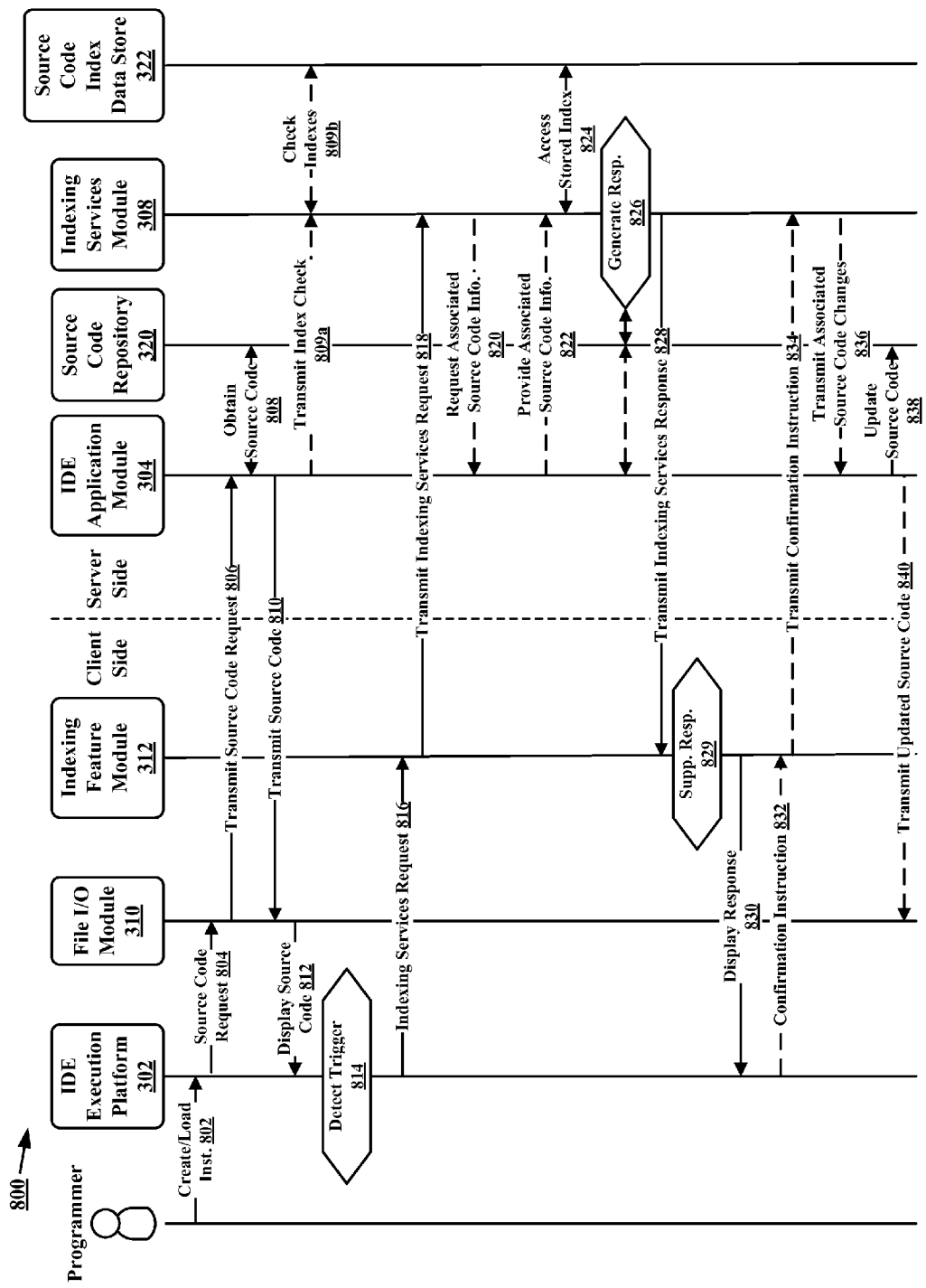
FIG. 8 is a ladder diagram in accordance with an example embodiment.
Figure 9:
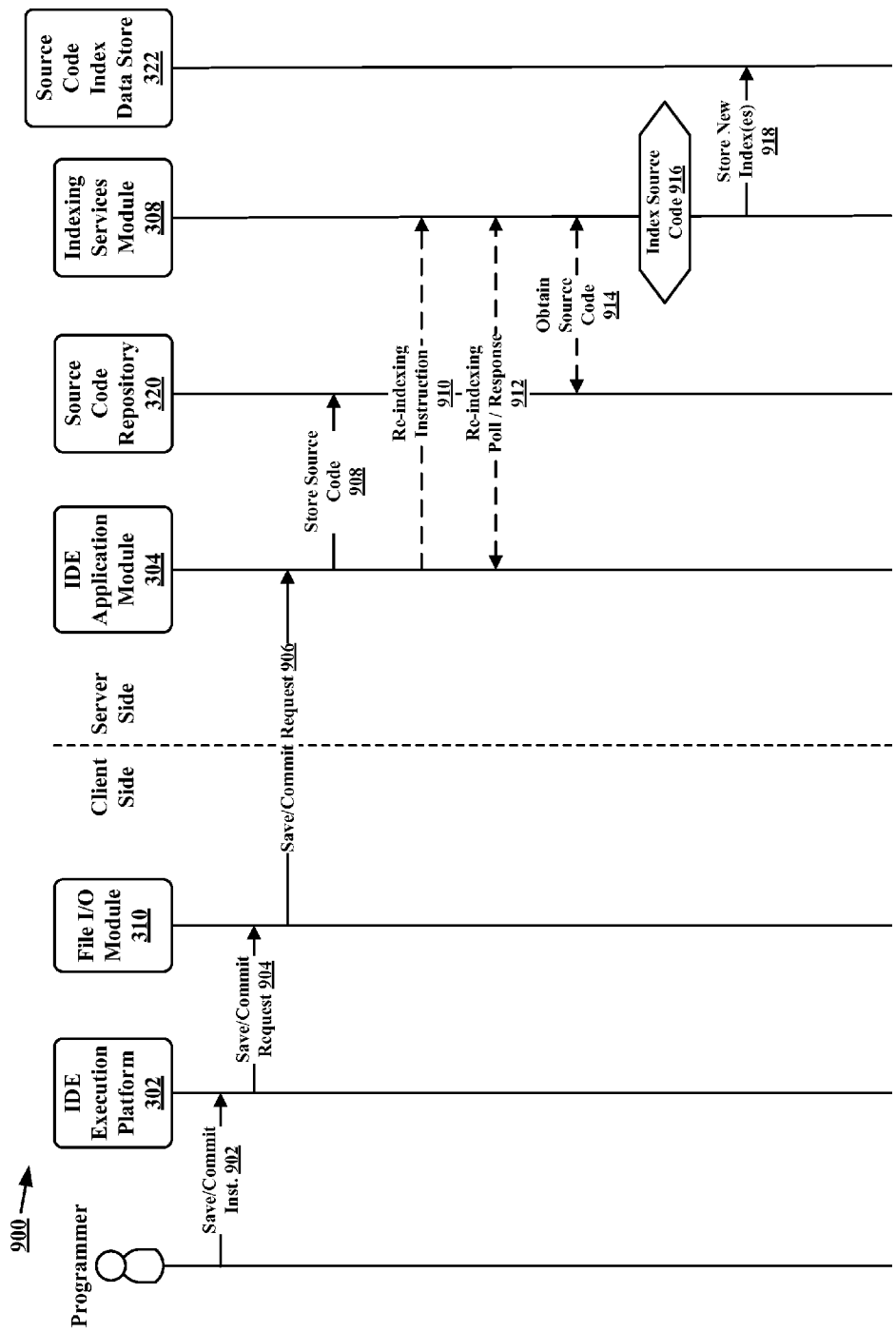
FIG. 9 is another ladder diagram in accordance with an example embodiment.

FIGS. 8 and 9 depict examples, in the form of ladder diagrams, of how information could flow from IDE execution platform 302 at a client computing device to one or more of an IDE application module 304 and an indexing services module 308 in order to facilitate offloading of index management and services from IDE execution platform 302 to cloud-based devices such as the IDE application module 304 and indexing services module 308. Each block or step in FIGS. 8 and 9 may represent processing of information or transmission of information in accordance with example embodiments. Alternative embodiments are included within the scope of the example embodiments of the present disclosure. In these alternative embodiments, functions may be executed out of order from that shown or discussed, including substantially concurrent or in reverse order, depending on the functionality involved, as would be understood by those reasonably skilled in the art. Further, more or fewer blocks may be used with either of ladder diagrams 800 and 900, and these ladder diagrams may be combined with one another, in part or in whole, without departing from the scope of the invention. Also, it should be understood that at least some of the information transmissions shown in FIGS. 8 and 9 may be between software and/or hardware modules in a same physical device. However, other information transmissions shown in these figures may be between software and/or hardware modules on different devices. Optional steps/actions are shown in Figures using dashed lines.

FIG. 8 is a ladder diagram 800 in accordance with an example embodiment in which source code is retrieved by IDE execution platform 302, and indexing services provided to IDE execution platform 302 by indexing services module 308. Processing begins in the ladder diagram 800 at step 802, when a developer uses IDE execution platform 302 to generate an instruction to create and/or load a source code file or a project including one or more source code files (or a portion of one or more source code file(s)), perhaps by requesting retrieval via a File drop-down menu in menus 402 of FIG. 4.

In response to receiving the instruction, IDE execution platform 302 transmits a source code retrieval request to a file I/O module 310 at step 804, and at step 806, the file I/O module 310 forwards the source code request to an appropriate IDE application module such as IDE application module 304 (perhaps via a connection such as connection 350 in FIG. 3). At step 808, IDE application module 304 accesses the remote source code repository 320, retrieves the one or more requested source code files, and may store the one or more requested source code files in source code work area 328. At step 810, IDE application module 304 provides the requested source code to file I/O module 310, and at step 812, at least a portion of the retrieved source code is displayed to the developer via IDE execution platform 302.

At optional step 809a, and in order to ensure that indexing services module 308 can provide on-line help functions to the indexing feature module 12 of IDE execution platform 302 without delay, IDE application module 304 may transmit an index check instruction to indexing services module 308 before or after transmitting the source code to the file I/O module 310 in step 810. The index check instruction may identify the one or more source code files retrieved from the source code repository 320 at step 808, and/or one or more related source code files, and may instruct indexing services module 308 to ensure that corresponding indexes stored in source code index data store 322 are up to date. The source code files themselves, or information sufficient to identify the source code files, may be included in the index check instruction.

At optional step 809b, indexing services module 308 compares source code file information associated with the source code files retrieved in step 808 with mapping information stored in source code index data store 322 that associates the indexes stored in the data store 322 with the source code files that they are based on. The mapping information may include, for example, one or more of source code file names, file paths, last-modified dates, version numbers, and calculated hash values (such as a CRC). If the indexes in source code index data store 322 associated with the source code files retrieved in step 808 are up to date, no further action may be taken by indexing services module 308 (beyond, perhaps, transmitting a corresponding information message to IDE application module 304 indicating that the indexes are up to date, a step not shown in FIG. 8). On the other hand, if the indexes are not up to date, indexing services module 308 may subject the source code files included in the index check instruction (or source code files retrieved from source code repository 320 using the information included in the index check instruction) to the indexers included in indexing engine 330, and store respective generated indexes in remote source code index data store 322 for future use in providing on-line help functions to the IDE execution platform 302.

After receiving and displaying the source code to the developer at IDE execution platform 302, the developer may begin editing or adding new source code. At some point in this process, IDE execution platform 302 may detect a trigger at step 814. The trigger may be any request for on-line help functions caused by the developer and/or the IDE execution platform 302. For example, the trigger may be a request for indexing information relative to a code-completion function, may be a request for to do information relative to functions that need to be completed by the developer, may be a refactoring instruction to modify one or more source code structures, or some other instruction or event that requires IDE execution platform 302 to access the on-line help services of indexing services module 308.

In response to detecting the trigger at step 814, IDE execution platform 302 transmits an indexing services request to indexing feature module 312. As set forth earlier, indexing feature module 312 contains one or more sub-modules that may, in conjunction with indexing services module 308, provide particular on-line help functions to IDE execution platform 302. As set forth in FIG. 3, indexing feature module 312 may include a code completion sub-module 314, an annotations look-up sub-module 315, and a refactoring sub-module 316. Each of these sub-modules 314-316 may store information relative to a location at which corresponding remote (e.g., cloud-based) indexing services can be accessed. While in the example shown in FIGS. 3 and 8, indexing services module 308 provides both code-completion functions and refactoring functions, in alternative embodiments, these functions may be provided by separate server devices accessible at separate locations or addresses. The indexing features sub-modules 314-316 may thus act as a conduit to direct on-line help function requests to a proper cloud-based indexing services destination (e.g., service provider).

At step 818, indexing feature module 312 (and/or one of its sub-modules 314-316) forwards the request to indexing services module 308. The indexing services request transmitted at step 818 may include information such as the particular on-line help function being requested (code-completion, refactoring, usages, to do, etc.), information sufficient to identify the source code file, files, or project loaded in IDE execution platform 302 (including, for example, one or more of source code file names, file paths, last-modified dates, version numbers, and calculated hash values (e.g., CRCs)), a partial identifier to be used in a code-completion request, a snippet of code to be used in a refactoring request, a full identifier to be used in a usages or to do request, or other information necessary or beneficial for the indexing services module's processing of the request.

At optional step 820, and in an embodiment in which related source code file information is either not transmitted in the request at step 818, or insufficient information is transmitted in the request at step 818, indexing services module 308 may transmit an associated source code information request to IDE application module 304 at step 820. The associated source code information request may identify at least the one source code file or project loaded into IDE execution platform 302 and identified in the request at step 818, and may request IDE application module 304, perhaps in cooperation with source code repository 320, to provide it with information sufficient to identify all associated source code files in a response at optional step 822. Information sufficient to identify the associated source code files may include the associated source code files themselves, or information such as file name, path, version number, etc. that uniquely identifies the associated source code files. The associated source code files may include, for example, libraries, inherited class files, extended class files, imported source code files, or other relationships that link the associated source code files with the source code loaded in IDE execution platform 302.

At step 824, indexing services module 308 accesses the source code index data store 322, and retrieves indexes for the source code file(s) identified in the request at step 818 and/or any indexes for associated source code files identified via optional steps 820 and 822. Once the necessary indexes are retrieved, indexing services module 308 generates a response. If necessary for generating the response (for example, for a refactoring operation), indexing services module 308 (perhaps via refactoring engine 332) may retrieve source code files from source code repository 320 at step 826 and/or may access the temporary source code work area 328 at IDE application module 304 (as illustrated by the arrows to the left of the "Generate Response" box at step 826). In one embodiment, indexing services module 308 may also access temporary source code work area 328 to obtain any changes to source code stored there that may not yet be reflected in the indexes at remote source code index data store 322 (or source code repository 320, for that matter). Indexing services module 308 could use the information obtained from temporary source code work area 328 to supplement the response prior to transmitting the response in the next step. The generated response may include, for example, a number of possible complete identifiers that may complete a partial identifier provided in step 818, may include one or more to do statements that match a to do listing request in step 818, may include a preview of changes to source code caused by a refactoring command in step 818, or may include some other response consistent with this disclosure. In any event, the generated response includes less than all information from the one or more indexes in source code index data store 322 corresponding to the source code file, files, or project loaded in IDE execution platform 302 and associated source code files determined in steps 818 and/or 820-822. Specifically, instead of returning one or more entire indexes to the IDE execution platform 302, the indexing services module 308 returns only a subset of indexing information that it maintains with respect to the identified source code files. In one embodiment, the generated response is limited to information responsive to the identified type of indexing request (e.g., code completion in this example), and may also be limited to the particular one or more source code files (and/or including related source code files) identified in the code completion request. Of course, for other types of indexing requests, different limited information may be provided and different indexes may be accessed.

At step 828, the response is transmitted from indexing services module 308 to the indexing feature module 312. At step 829, indexing feature module 312 may determine whether the response received at step 828 needs to be supplemented with any changes to the source code at IDE execution platform 302 that may not yet have been saved to the source code work area 328 or the remote source code repository 320.

For example, if an additional to do statement has been added to the source code at IDE execution platform, but that addition has not yet been saved to either source code work area 328 and/or remote source code repository 320, it may not be reflected in the response received at step 828. Accordingly, indexing feature module 312 may determine that the response received is a to do function listing response, determine whether any applicable (e.g., to do function statements) unsaved or uncommitted changes have been made to the source code at IDE execution platform 302, and may supplement the response with the unsaved and/or uncommitted changes prior to displaying the results at step 830. At step 830, at least a portion of the response (perhaps also supplemented by indexing feature module 312) is displayed to the developer via the IDE execution platform 302. Subsequent similar or different on-line help inquires may be exchanged between IDE execution platform 302 and indexing services module 308 in a same or similar manner.

In the event that the indexing services request transmitted at step 816 included a refactoring request, the indexing services response received at step 830 may include a preview of changes to source code that would be caused by the refactoring request. In response to receiving this preview information, and as set forth in FIG. 7 above, a confirmation dialog box may be displayed requested developer confirmation to apply the proposed changes.

Accordingly, at optional step 832, a confirmation instruction confirming that the refactoring operation should be applied may be received by IDE execution platform 302 and transmitted to indexing feature module 312. At optional step 834, indexing feature module 312 may forward the instruction to indexing services module 308. At optional step 836, the associated source code changes (temporarily stored at indexing services module 308 while the confirmation request was sent) are transferred to IDE application module 304, which may store the changes to the temporary source code work area 328 and commit the changes to remote source code repository 320 at optional step 838.

In one embodiment, indexing services module 308 may commit the changes directly to the source code repository 320. However, in order to ensure that the copies of the source code files being temporarily stored at source code work area 328 are updated correspondingly, indexing services module 308 may transmit an instruction at optional step 836 to IDE application module 304 to re-checkout (or merge) the source code files from source code repository 320 to the temporary source code work area 328. In this embodiment, optional step 838 would not be required.

At optional step 840, the updated source code is transmitted to the file I/O module 310 for further display to the developer via IDE execution platform 302.

As set forth in optional steps 809a and 809b above, IDE application module 304 and/or indexing services module 308 may take steps to ensure that the indexes stored at source code index data store 322 are up to date. In addition to executing this check when source code files or loaded or retrieved from source code repository 320, as in steps 809a and 809b, additional checks may be executed when source code files are saved or committed to source code repository 320. FIG. 9 illustrates this process in more detail in the form of a ladder diagram 900.

At step 902 in FIG. 9, a save and/or commit instruction is received at IDE execution platform 302, and at step 904, the instruction is forwarded to the file I/O module 310. At step 906, the file I/O module 310 forwards the save/commit request to the IDE application module 304. In response to receiving the save/commit request, the IDE application module 304 commits the changes (e.g., which may include a merge operation) stored in the source code work area 328 to the source code repository 320.

Furthermore, and in order to ensure that the indexes at source code index data store 322 are kept up to date, IDE application module 304 may transmit a re-indexing instruction to the indexing services module 308 at optional step 910. Alternatively or additionally, at optional step 912, the indexing services module may be configured to poll the IDE application module 304 for any newly saved or committed source code files, in response to which IDE application module 304 may provide the actual source code files, or information sufficient to identify the source code files to indexing services module 308. At optional step 914, and in the event the source code files themselves are not provided to the indexing services module 308 at step 910 or 912, the indexing services modules may independently obtain the corresponding updated/changed source code files from the source code repository 320.

At step 916, the indexing services module 308 subjects the source code files to one or more of the indexers in indexing engine 330, and at optional step 918, stores the newly created indexes to source code index data store 322. Other methods of ensuring that source code index data store 322 is kept up to date could be used as well.

8. Computer Readable Instructions

Figure 10:
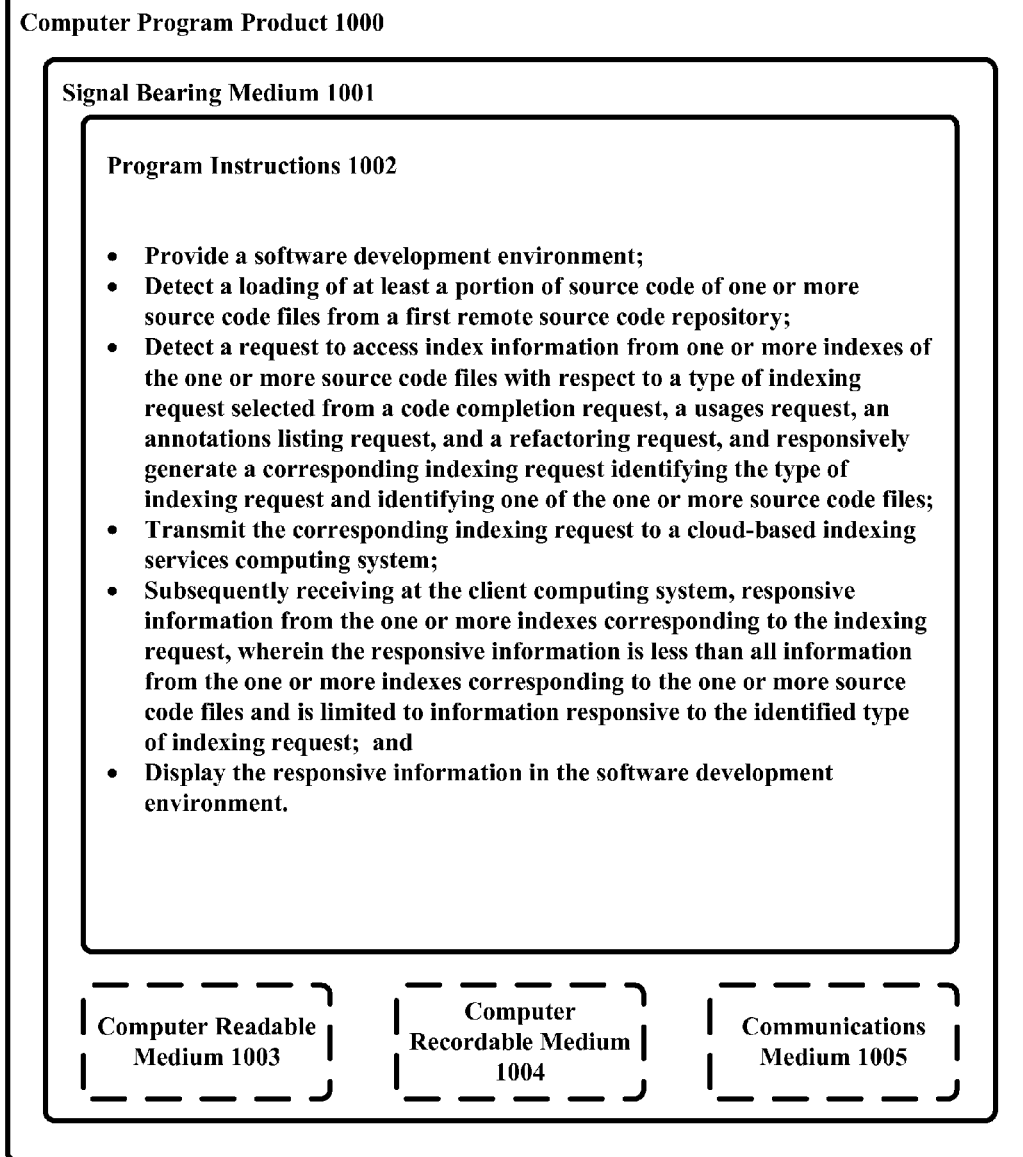
FIG. 10 is a schematic illustrating a conceptual partial view of an example computer program product.

In some embodiments, the disclosed methods (for example, those methods described above with respect to FIGS. 3-9) may be implemented as computer program instructions encoded on a computer-readable storage media or tangible computer-readable storage media in a machine-readable format. FIG. 10 is a schematic illustrating a conceptual partial view of an example computer program product 1000 that includes a computer program for executing a computer process on a computing device, arranged according to at least some embodiments presented herein. In one embodiment, the example computer program product 1000 is provided using a signal bearing medium 1001. The signal bearing medium 1001 may include one or more programming instructions 1002 that, when executed by one or more processors, may provide functionality or portions of the functionality described above with respect to FIGS. 3-9. Thus, for example, referring to the embodiments illustrated in FIGS. 8 and 9, one or more features of blocks or steps 802-840 and/or 902-918 may be undertaken by one or more instructions associated with the signal bearing medium 1001.

In some examples, the signal bearing medium 1001 may encompass a tangible computer-readable medium 1003, such as, but not limited to, a hard disk drive, a Compact Disc (CD), a Digital Video Disk (DVD), a digital tape, memory, etc. In some implementations, the signal bearing medium 1001 may encompass a computer recordable medium 1004, such as, but not limited to, memory, read/write (R/W) CDs, R/W DVDs, etc. In some implementations, the signal bearing medium 1001 may encompass a communications medium 1005, such as, but not limited to, a digital and/or an analog communication medium (e.g., a fiber optic cable, a waveguide, a wired communication link, a wireless communication link, etc.). Thus, for example, the signal bearing medium 1001 may be conveyed by a wireless form of the communications medium 1005 (e.g., a wireless communications medium conforming with the IEEE 802.11 standard or other transmission protocol).

The one or more programming instructions 1002 may be, for example, computer executable and/or logic implemented instructions. In some examples, a computing device such as the computing device 200 of FIG. 2A may be configured to provide various operations, functions, or actions in response to the programming instructions 1002 conveyed to the computing device 200 by one or more of the computer readable medium 1003, the computer recordable medium 1004, and/or the communications medium 1005.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A computer implemented method for accessing cloud-based indexing services, the method comprising:
    providing, via a client computing system, a software development environment;
    detecting, via the client computing system, a loading of at least a portion of source code of one or more source code files from a first remote source code repository;
    detecting, via the client computing system, a request to access index information from one or more indexes of the one or more source code files with respect to a type of indexing request selected from a code completion request, a usages request, an annotations listing request, and a refactoring request, and responsively generating a corresponding indexing request identifying the type of indexing request and identifying one of the one or more source code files;
    transmitting the corresponding indexing request to a cloud-based indexing services computing system;
    the cloud-based indexing services computing system transmitting an associated source code file request, identifying the one of the one or more source code files, to the first remote source-code repository computing system;
    the first remote source-code repository computing system retrieving information comprising one or more identities of one or more related source code files associated with the one of the one or more source code files, and transmitting the information comprising the one or more identities of one or more related source code files to the cloud-based indexing services computing system, wherein the information comprising the one or more identities of one or more related source code files associated with the at least one source code file includes, for each source code file, one or more of a file name, a file path, a last-modified date, a version number, and a calculated hash value;
    accessing the one or more indexes corresponding to the one or more source code files and the type of indexing request via a source code index data store using the provided one or more identities of the one or more related source code files;
    subsequently receiving at the client computing system, responsive information from the one or more indexes corresponding to the indexing request, wherein the responsive information is less than all information from the one or more indexes corresponding to the one or more source code files and is limited to information responsive to the identified type of indexing request; and
    displaying, via the client computing system, the responsive information in the software development environment.

2. The method of claim 1, wherein the first remote source code repository and the cloud-based indexing services computing system are a same computing system.

3. The method of claim 1, further comprising, retrieving software development executable instructions from a remote application server, and providing the software development environment responsive to executing the software development executable instructions via the client computing system.

4. The method of claim 1, wherein the type of indexing request is the code completion request, and wherein the generated corresponding indexing request includes at least a partial text entry of a programming statement received by the software development environment, and wherein the responsive information is a plurality of partially matching programming statements retrieved from the one or more indexes, but less than all programming statements included in the one or more indexes.

5. The method of claim 4, further comprising:
    detecting a selection of one of the plurality of partially matching programming statements; and
    completing the at least partial text entry using the selected one of the plurality of partially matching programming statements.

6. The method of claim 1, wherein the type of indexing request is the usages request, and wherein the generated corresponding indexing request includes a complete programming statement received by the software development environment, and wherein the responsive information is one or more location statements identifying where the complete programming statement is used in source code files related to the at least the portion of source code.

7. The method of claim 1, wherein the type of indexing request is the refactoring request, and wherein the generated corresponding indexing request includes a complete programming statement and a refactoring instruction received by the software development environment.

8. The method of claim 7, wherein the responsive information includes a preview of an effect the refactoring instruction would have on source code files related to the at least the portion of source code.

9. The method of claim 8, further comprising transmitting a second request instructing the cloud-based indexing services computing system to implement the source code changes set forth in the responsive information.

10. The method of claim 7, wherein the responsive information includes one of a success indication and a failure indication with respect to the refactoring request.

11. The method of claim 1, further comprising modifying the responsive information in accordance with detected changes to the portion of source code that have not yet been transmitted to the first remote source code repository.

12. A computer implemented method for providing cloud-based indexing services, the method comprising:
    receiving at a cloud-based indexing services computing system, from a remote client computing system, an indexing request to access index information from one or more indexes corresponding to one or more source code files identified in the indexing request, the indexing request also identifying a type of indexing request selected from a code completion request, a usages request, an annotations listing request, and a refactoring request, wherein the indexing request identifies at least one source code file;
    the cloud-based indexing services computing system transmitting an associated source code file request, identifying the at least one source code file, to a source-code repository computing system;

the source-code repository computing system retrieving information comprising one or more identities of one or more related source code files associated with the at least one source code file, and transmitting the information comprising the one or more identities of one or more related source code files to the cloud-based indexing services computing system, wherein the information comprising the one or more identities of one or more related source code files associated with the at least one source code file includes, for each source code file, one or more of a file name, a file path, a last-modified date, a version number, and a calculated hash value;

accessing one or more indexes corresponding to the one or more source code files and the type of indexing request via a source code index data store using the provided one or more identities of the one or more related source code files;

generating responsive index information from the one or more indexes corresponding to the type of indexing request, wherein the responsive index information is less than all information from the one or more indexes corresponding to the one or more source code files, and is limited to information responsive to the identified type of indexing request; and transmitting the generated responsive index information to the remote client computing system.

13. The method of claim 12, further comprising, prior to receiving the indexing request:

receiving, at a source-code repository computing system, a source code access request from the remote client computing system;

accessing, via the source-code repository computing system, a source code repository store and retrieving one or more source code files associated with the source code access request;

storing the retrieved one or more source code files in temporary storage for tracking modifications made to the one or more source code files by the remote client computing system; and transmitting at least a portion of the retrieved one or more source code files to the remote client computing system for display.

14. The method of claim 13, further comprising:

transmitting, from the source-code repository computing system to the cloud-based indexing services computing system, a predictive indexing request identifying the one or more source code files associated with the source code access request;

generating, at the cloud-based indexing services computing system, one or more indexes of the one or more source code files; and storing the one or more generated indexes in the source code index data store.

15. The method of claim 12, wherein the type of indexing request is the usages request, the indexing request including a complete programming statement for which usages is being requested, and wherein the responsive information includes one or more location statements identifying where the complete programming statement is used in the one or more corresponding source code files, as retrieved from the one or more indexes.

16. The method of claim 12, wherein the type of indexing request is the refactoring request, the indexing request including a complete programming statement and a refactoring instruction.

17. The method of claim 16, wherein the responsive information includes a preview of an effect the refactoring instruction would have on one or more corresponding source code files.

18. The method of claim 17, further comprising:

receiving a second indexing request including an instruction to implement the source code changes set forth in the responsive information;

responsively modifying the one or more corresponding source code files in accordance with the refactoring request, and transmitting the modified one or more corresponding source code files to a remote source code repository for storage.

19. The method of claim 16, wherein the responsive information includes one of a success indication and a failure indication with respect to the refactoring instruction.

20. The method of claim 12, wherein the indexing request identifies the one or more source code files, and the cloud-based indexing services computing system is configured to use the provided identities of the one or more source code files in accessing the one or more indexes at the source code index data store.

21. The method of claim 20, wherein the indexing request identifies the one or more source code files via one or more of file name, file path, last-modified date, version number, and calculated hash value.

22. The method of claim 12, further comprising, prior to transmitting the responsive indexing information to the remote client computing system, accessing a temporary source code data store at a source-code repository computing system and augmenting the responsive indexing information corresponding to detected modifications made to the one or more source code files that are not yet reflected in the one or more indexes corresponding to the one or more source code files.

* * * * *